(12) United States Patent
Ventura et al.

(10) Patent No.: US 10,866,945 B2
(45) Date of Patent: Dec. 15, 2020

(54) USER ACCOUNT MANAGEMENT VIA A DISTRIBUTED LEDGER

(71) Applicant: AlphaPoint, New York, NY (US)

(72) Inventors: Giuseppe Ventura, New York, NY (US); Jeffrey Tangowski, New York, NY (US)

(73) Assignee: AlphaPoint, New York, NY (US)

( * ) Notice: Subject to any disclaimer, the term of this patent is extended or adjusted under 35 U.S.C. 154(b) by 262 days.

(21) Appl. No.: 15/728,967

(22) Filed: Oct. 10, 2017

(65) Prior Publication Data

US 2018/0101842 A1    Apr. 12, 2018

Related U.S. Application Data

(63) Continuation of application No. 15/728,689, filed on Oct. 10, 2017.

(Continued)

(51) Int. Cl.
*G06F 16/00* (2019.01)
*G06F 16/23* (2019.01)
(Continued)

(52) U.S. Cl.
CPC ............ *G06F 16/235* (2019.01); *G06F 3/065* (2013.01); *G06F 3/067* (2013.01); *G06F 3/0619* (2013.01); *G06F 11/1448* (2013.01); *G06F 11/1458* (2013.01); *G06F 11/2025* (2013.01); *G06F 16/178* (2019.01); *G06F 16/27* (2019.01); *G06Q 10/087* (2013.01); *G06Q 20/3674* (2013.01); *G06Q 20/3829* (2013.01); *H04L 9/0841* (2013.01); *H04L 9/3013* (2013.01); *G06F 2201/84* (2013.01); *G06F 2201/85* (2013.01)

(58) Field of Classification Search
CPC .............. G06F 11/1448; G06F 11/158; G06F 11/2015; G06F 2201/84; G06F 2201/85; G06F 16/235; G06F 16/27; G06F 16/178; G06F 11/1458; G06F 11/2025; G06F 3/0619; G06F 3/065; G06F 3/067; G06Q 10/087; G06Q 20/3674; G06Q 20/3829; G06Q 10/3674; H04L 9/0841; H04L 9/3013
USPC ...................................................... 707/690
See application file for complete search history.

(56) References Cited

U.S. PATENT DOCUMENTS 6,233,565 B1    5/2001  Lewis et al.
6,311,165 B1    10/2001 Coutts et al.
(Continued)

*Primary Examiner* — Thanh-Ha Dang
(74) *Attorney, Agent, or Firm* — Alston & Bird LLP

(57) ABSTRACT

User access to a set of data stored in a distributed ledger, wherein the distributed ledger is stored by a plurality of node computing entities, is provided. A first node computing entity receives a share key request indicating that a first user account has authorized a second user account to have access to a set of data stored in the distributed ledger. A data access key (DAK) for accessing the set of data is encrypted using an encrypting key of the second user account. A block comprising the encrypted DAK is generated, signed using a signing key of the first user account, and posted to the distributed ledger. The block is authenticated using an authentication key of the first user account and accessed via a decrypting key of the second user account such that the second user account may use the DAK to access the set of data.

20 Claims, 19 Drawing Sheets

Related U.S. Application Data

(60) Provisional application No. 62/406,059, filed on Oct. 10, 2016, provisional application No. 62/408,336, filed on Oct. 14, 2016, provisional application No. 62/408,339, filed on Oct. 14, 2016, provisional application No. 62/408,344, filed on Oct. 14, 2016.

(51) Int. Cl.

| | | |
|---|---|---|
| *G06F 16/27* | (2019.01) | |
| *G06F 16/178* | (2019.01) | |
| *G06F 11/14* | (2006.01) | |
| *G06F 11/20* | (2006.01) | |
| *G06Q 10/08* | (2012.01) | |
| *G06Q 20/36* | (2012.01) | |
| *G06Q 20/38* | (2012.01) | |
| *H04L 9/08* | (2006.01) | |
| *H04L 9/30* | (2006.01) | |
| *G06F 3/06* | (2006.01) | |

(56) References Cited

U.S. PATENT DOCUMENTS

| | | |
|---|---|---|
| 6,678,828 B1 | 1/2004 | Pham et al. |
| 6,898,727 B1 | 5/2005 | Wang et al. |
| 7,028,228 B1 | 4/2006 | Lovy et al. |
| 7,076,691 B1 | 7/2006 | Dobberpuhl et al. |
| 7,200,869 B1 | 4/2007 | Hacherl et al. |
| 7,296,194 B1 | 11/2007 | Lovy et al. |
| 8,301,572 B2 | 10/2012 | Ogg et al. |
| 8,812,612 B1 | 8/2014 | Laier et al. |
| 8,984,048 B1 | 3/2015 | Maniscalco et al. |
| 8,984,268 B2 * | 3/2015 | VanHeyningen ... H04L 63/0281 713/150 |
| 9,632,892 B1 | 4/2017 | Sledz et al. |
| 9,703,986 B1 | 7/2017 | Ashley et al. |
| 9,755,836 B2 * | 9/2017 | Bellwood ............. H04L 9/3247 |
| 9,858,781 B1 * | 1/2018 | Campero ............. G07F 7/0826 |
| 10,255,153 B2 | 4/2019 | Ganapathy et al. |
| 2002/0178354 A1 | 11/2002 | Ogg et al. |
| 2003/0005350 A1 | 1/2003 | Koning et al. |
| 2003/0120948 A1 | 6/2003 | Schmidt et al. |
| 2006/0173599 A1 | 8/2006 | Landes et al. |
| 2006/0248350 A1 | 11/2006 | Stanev |
| 2007/0033154 A1 | 2/2007 | Trainum et al. |
| 2007/0266394 A1 | 11/2007 | Odent et al. |
| 2008/0127292 A1 | 5/2008 | Cooper et al. |
| 2008/0162840 A1 | 7/2008 | Augenstein |
| 2008/0320245 A1 | 12/2008 | Tomlin et al. |
| 2009/0164804 A1 * | 6/2009 | Mardiks ................. H04L 9/321 713/193 |
| 2012/0109895 A1 | 5/2012 | Zwilling et al. |
| 2012/0151272 A1 | 6/2012 | Behrendt et al. |
| 2012/0290706 A1 | 11/2012 | Lin et al. |
| 2013/0205006 A1 | 8/2013 | Panche et al. |
| 2013/0208880 A1 | 8/2013 | Lovy et al. |
| 2014/0279884 A1 | 9/2014 | Dantkale et al. |
| 2015/0186043 A1 | 7/2015 | Kesselman et al. |
| 2015/0312337 A1 | 10/2015 | Keremane et al. |
| 2015/0363319 A1 | 12/2015 | Qi et al. |
| 2016/0005248 A1 * | 1/2016 | Aase ........................ G07C 9/28 340/5.61 |
| 2016/0063496 A1 * | 3/2016 | Royyuru ............... H04L 9/3226 705/71 |
| 2016/0173599 A1 | 6/2016 | Chablani et al. |
| 2016/0266823 A1 | 9/2016 | Hong |
| 2016/0292672 A1 * | 10/2016 | Fay ........................ G06Q 20/36 |
| 2017/0011460 A1 * | 1/2017 | Molinari ............... G06F 21/645 |
| 2017/0048217 A1 * | 2/2017 | Biggs ..................... H04L 9/3242 |
| 2017/0075938 A1 * | 3/2017 | Black ..................... H04L 9/3239 |
| 2017/0083709 A1 * | 3/2017 | Simmons .............. G06F 21/602 |
| 2017/0083713 A1 * | 3/2017 | Simmons .............. H04L 9/0869 |
| 2017/0124535 A1 * | 5/2017 | Juels ..................... G06Q 20/0655 |
| 2017/0177855 A1 * | 6/2017 | Costa Faidella ........ G06F 21/45 |
| 2017/0180128 A1 * | 6/2017 | Lu ......................... H04L 9/3247 |
| 2017/0230375 A1 * | 8/2017 | Kurian .................. H04L 63/102 |
| 2017/0236120 A1 * | 8/2017 | Herlihy ................... G06F 21/57 705/67 |
| 2017/0262186 A1 | 9/2017 | Cowling et al. |
| 2017/0279818 A1 * | 9/2017 | Milazzo ................ H04L 63/145 |
| 2017/0300898 A1 * | 10/2017 | Campero .............. H04L 9/3236 |
| 2017/0329525 A1 | 11/2017 | Simonson et al. |
| 2017/0331896 A1 * | 11/2017 | Holloway ................. H04L 9/12 |
| 2017/0352012 A1 * | 12/2017 | Hearn ................. G06Q 20/3827 |
| 2017/0366357 A1 * | 12/2017 | Pattanaik ........... G06Q 20/3829 |
| 2018/0032383 A1 * | 2/2018 | Surcouf ................. H04L 9/088 |
| 2018/0091489 A1 * | 3/2018 | Biggs ..................... H04L 9/3255 |
| 2018/0096066 A1 | 4/2018 | Venkataramanappa et al. |
| 2018/0096349 A1 * | 4/2018 | McDonald ........... G06Q 20/102 |
| 2019/0013943 A1 * | 1/2019 | Maim ..................... G06F 21/51 |
| 2019/0073666 A1 * | 3/2019 | Ortiz ..................... G06F 16/27 |
| 2019/0179562 A1 | 6/2019 | Byun |
| 2019/0268430 A1 * | 8/2019 | van Gent ............. H04L 67/306 |
| 2020/0082364 A1 * | 3/2020 | Hearn ................... H04L 9/3297 |

\* cited by examiner

FIG. 5

```
// Common Block structure
Block {
  MessageType;
  EdgeNodeID;
  Header;
  StateMachineRecordSet;     //List of (0:N) Action-State combinations
  {
    ID;
    Version;
    ...
  }
  StateMachineRecord
  {
    Event;
    DomainObjectStateList;   //List of (0:N) DomainObjectState elements
    EventDateTimeUtc;
    SystemDateTimeUtc;
  }
}
```

610

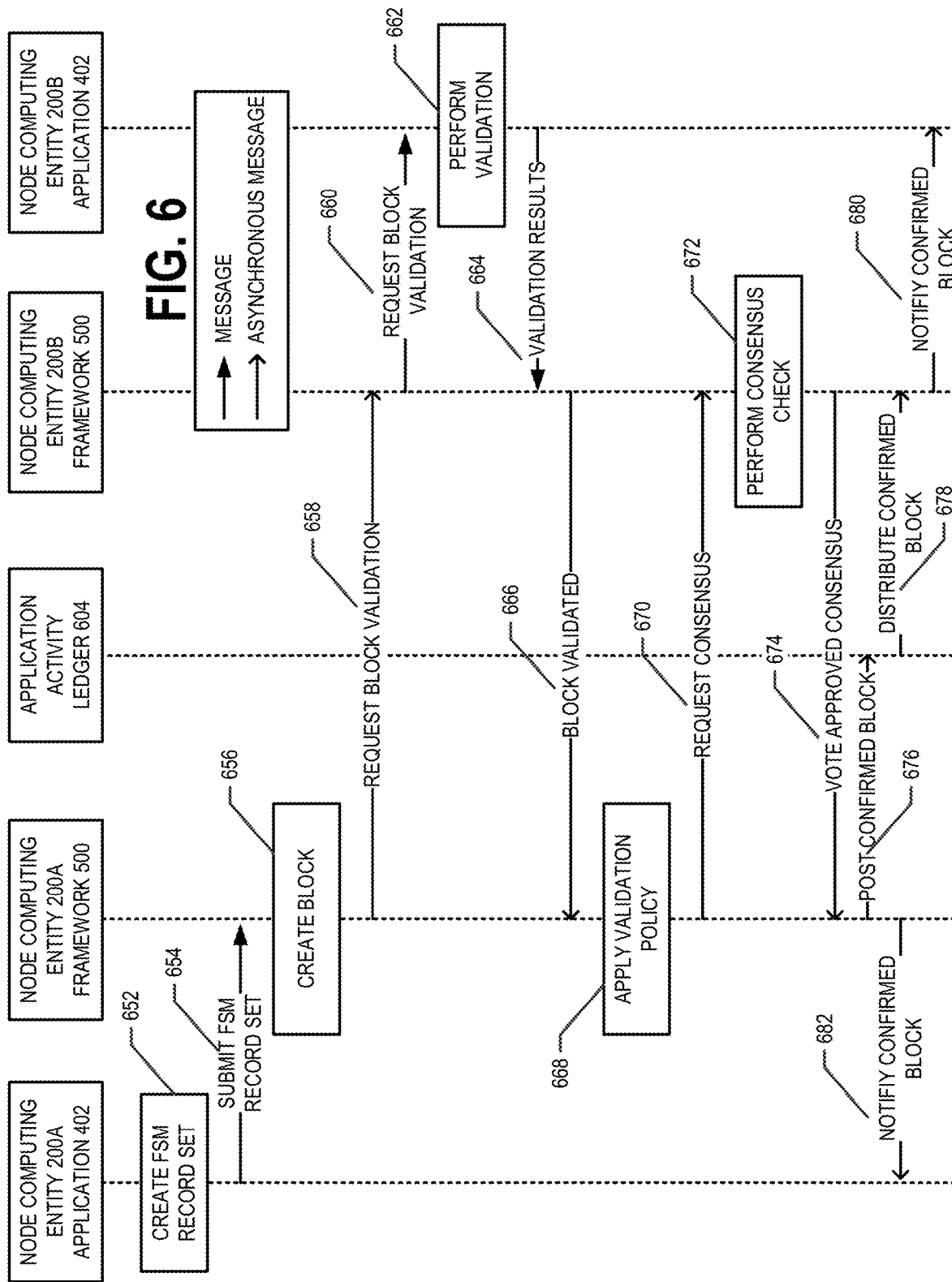

| Structure | Elements | Description |
|---|---|---|
| User Information/Data | | some example user account information/data |
| | UserID | A GUID or other unique ID for identifying the user |
| | Name | A user name |
| | Group | e.g., an organization/division name |
| | DSA Key Pair | Signing/Verification Keys: Public verification key of the identified user and Private signing key of the identified user |
| | DHM Key Pair | Encryption/Decryption Keys: Public encryption key and Private key for decrypting |
| Key Information/Data | | DAK (symmetric key) definition structure |
| | KeyID | A GUID or other unique ID for identifying the key |
| | Name | A key name |
| | Key | Key value |

FIG. 11A

| Key | Purpose | Example |
|---|---|---|
| Signing key | Used to sign data | Private DSA |
| Authentication key | Used to verify signed data | Public DSA |
| Decrypting key | Used to decrypt data targeted to key owner | Private DHM |
| Encyrpting key | Used to encrypt data targeted to key owner | Public DHM |

FIG. 11B

```
// Common Block structure
Block {
    MessageType,
    LedgerMessage,
    Header,
    StateMachineRecordList,       //List of (0:N) Action-State combinations
}

LedgerMessage,
VerificationProof

StateMachineRecord {
    Event,
    DomainObjectStateList,        //AddedUser or ShareKey
    EventDateTimeUtc,             //List of (0:N) DomainObjectState elements
    SystemDateTimeUtc
}

// User Management Messages
AddEditUser {
    MessageType,                  //AddEditUser
    UserInfo,                     //User
    IsDelete
}                                 ─ 612

Sharekey {                        ─ 614
    MessageType,                  //Sharekey
    ReceivedUserId,
    KeyType,                      //"Sym" or "Asm"
    EncryptedKeyInfoContainer
}
```

FIG. 13

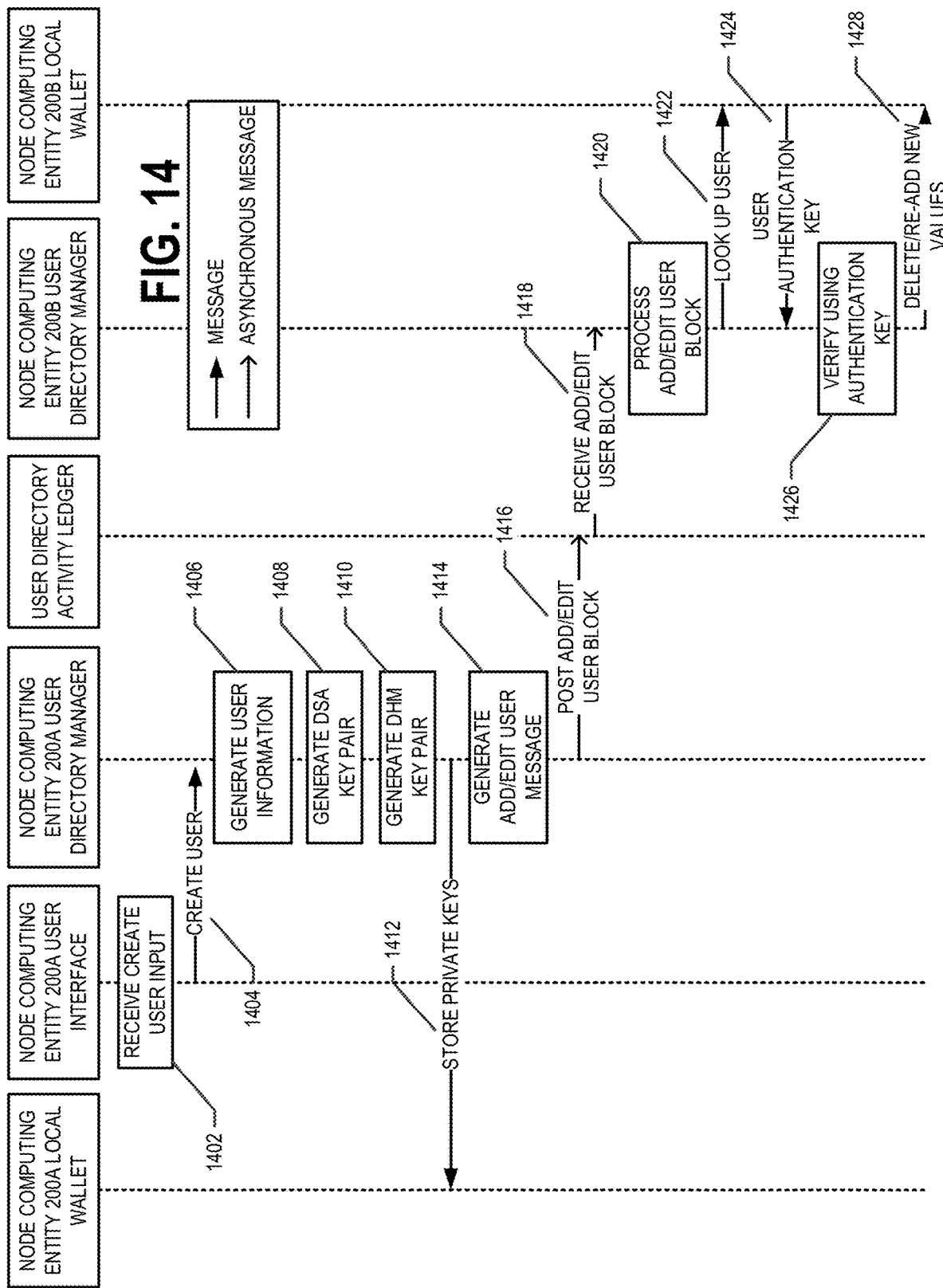

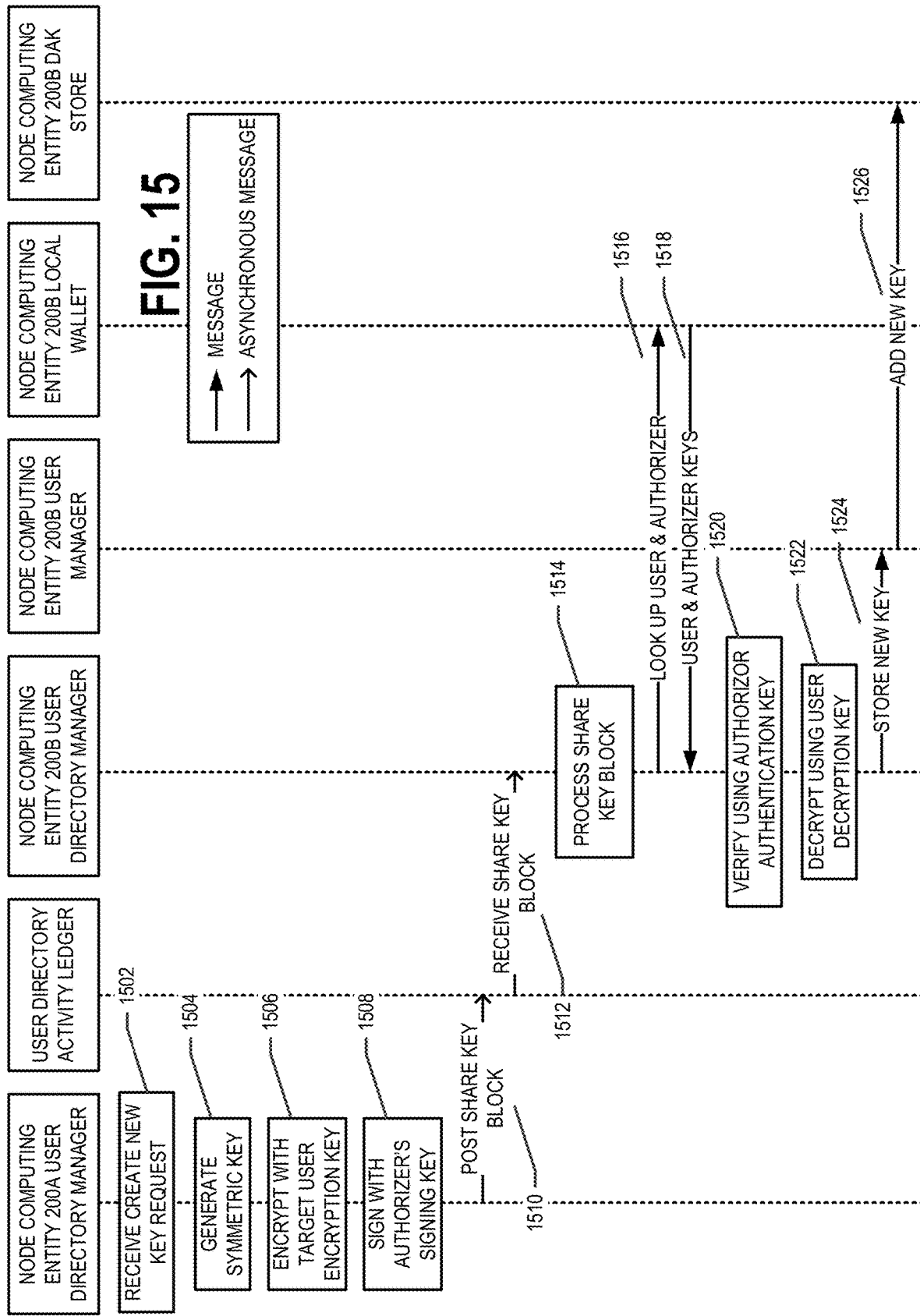

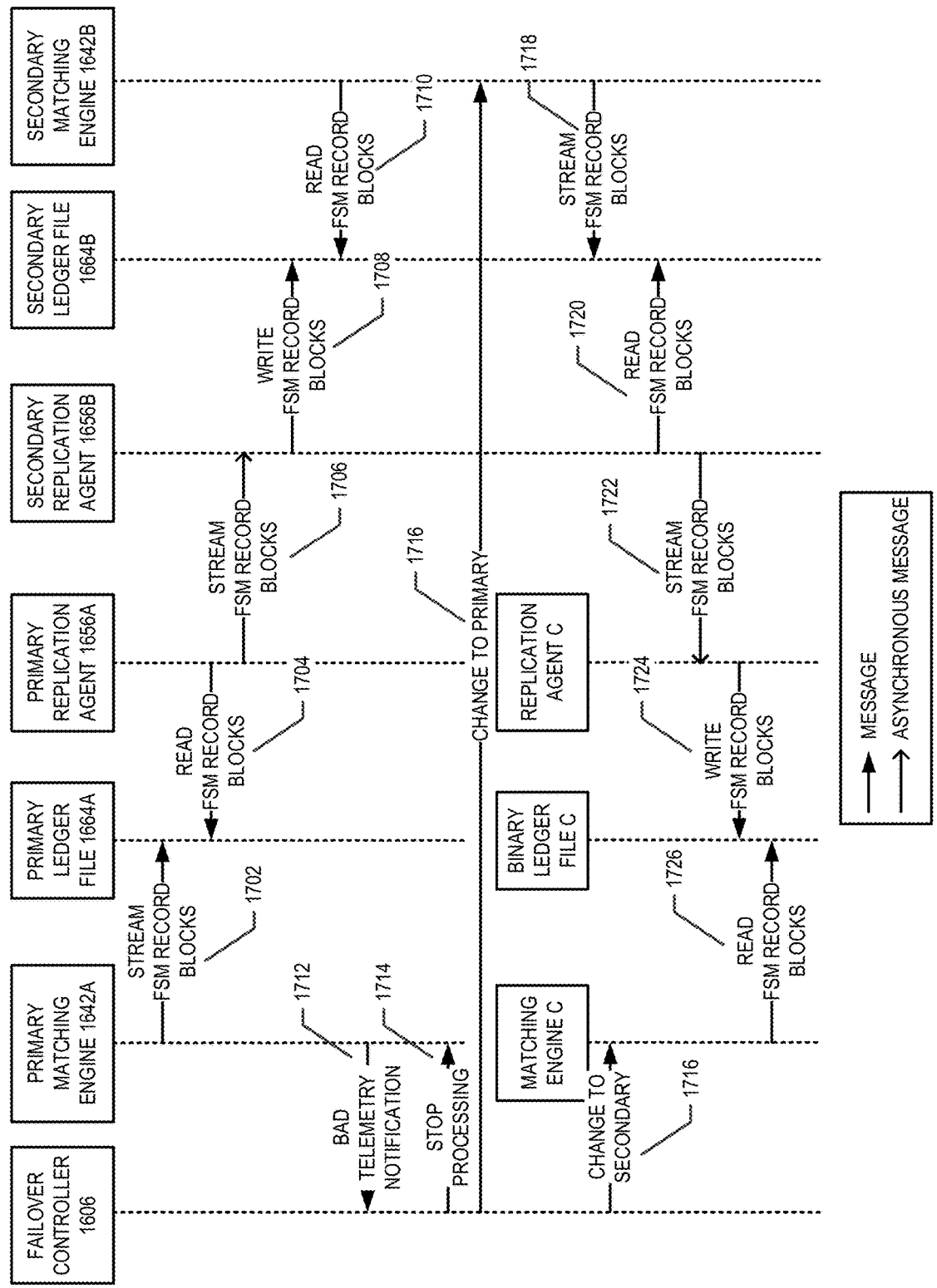

USER ACCOUNT MANAGEMENT VIA A DISTRIBUTED LEDGER

CROSS-REFERENCE TO RELATED APPLICATIONS

This application is a continuation of U.S. application Ser. No. 15/728,689, filed Oct. 10, 2017, which claims priority to U.S. Application Nos. 62/406,059, filed Oct. 10, 2016; 62/408,336, filed Oct. 14, 2016; 62/408,339, filed Oct. 14, 2016; and 62/408,344, filed Oct. 14, 2016, the contents of which are incorporated by reference herein in their entireties.

FIELD

Various embodiments relate generally to the field of computer system architecture and administrating user access to the computer system. An example embodiment relates to the system architecture of a distributed computing system and administrating user access thereto.

BACKGROUND

Distributed ledgers can provide an immutable record of transactions or activities. However, this record of transactions or activities may become quite large over time. Generally, to add a new node to the ledger, the new node must read through the record of transactions or activities to determine the current state of each of the elements of the transactions or activities. This process may take a large amount of time and requires a large amount of computer-readable storage. Additionally, some of the information regarding a transaction or activity that is added to the ledger may be sensitive information that should only be accessible to particular users. For example, account information needed to process a transaction should only be accessible to users who need the account information to process the transaction. Therefore, managing a distributed ledger and access to the information/data stored therein can be difficult.

BRIEF SUMMARY OF SOME EXAMPLE EMBODIMENTS

Example embodiments of the present invention provide methods, systems, apparatuses, and computer program products for a distributed ledger system and administrating user access thereto. An example embodiment provides a finite system machine (FSM) record and/or a ledger comprising one or more FSM records with entries (e.g., data structures) for recording events and transformations associated with the events subject to the semantics and rules enforced by the distributed ledger system. Example embodiments provide a distributed ledger system having intrinsic bi-temporal primitives. An example embodiment provides for generating a snapshot of the system at a particular point in time so as to enable point-in-time node restarts and to support efficient information lifecycle management. In an example embodiment, such a snapshot may be distributed to each node of the system via the distributed ledger itself. An example embodiment provides a user directory which applies distributed ledger technology to a common system to provide user account management, authentication, and data permissioning via data access keys (DAKs). The DAKs are distributed through the ledger itself, in an example embodiment, thereby providing an immutable and verifiable record of user accounts and decryption grants to implement application data security and access controls. An example embodiment provides an immediate and automatic failover from a primary order book to a secondary order book in response to a failover trigger. In an example embodiment, the failover or switch from the primary order book to the secondary order book is immediate in the sense that a recovery process of iterating through the ledger of order information to is not required before the start of processing of new order related events using the secondary order book.

According to one aspect of the present invention, a method for updating an user activity directory ledger, the user activity directory ledger being a distributed ledger, the distributed ledger stored by a plurality of node computing entities. In an example embodiment, the method comprises creating, by a node computing entity of the plurality of node computing entities and comprising at least one processor, a memory, and a communications interface configured to communicate via at least one network, a finite state machine record set. A finite state machine record of the finite state machine record set comprises (a) event data for a corresponding event and (b) a domain object state for a domain object corresponding to the corresponding event. The domain object state indicates the state of the domain object as a result of the corresponding event. The method further comprises generating, by the node computing entities, a block comprising the finite state machine record set; and posting the block to the user activity directory ledger.

According to another aspect of the present invention, an apparatus for updating a user activity directory ledger, the user activity directory ledger being a distributed ledger is provided. The distributed ledger is stored by a plurality of node computing entities and the apparatus is one of the plurality of node computing entities. In an example embodiment the apparatus comprises at least one processor, a communications interface configured for communicating via at least one network, and at least one memory storing computer program code. The at least one memory and the computer program code are configured to, with the processor, cause the apparatus to at least create a finite state machine record set. A finite state machine record of the finite state machine record set comprises (a) event data for a corresponding event and (b) a domain object state for a domain object corresponding to the corresponding event. The domain object state indicates the state of the domain object as a result of the corresponding event. The at least one memory and the computer program code are further configured to, with the processor, cause the apparatus to at least generate a block comprising the finite state machine record set; and post the block to the user activity directory ledger.

According to yet another aspect of the present invention, a computer program product for updating a user activity directory ledger, the user activity directory ledger being a distributed ledger, the distributed ledger stored by a plurality of node computing entities is provided. In an example embodiment the computer program product comprises at least one non-transitory computer-readable storage medium having computer-executable program code instructions stored therein. The computer-executable program code instructions comprise program code instructions configured to, when executed by a processor of a node computing entity of the plurality of node computing entities, create a finite state machine record set. A finite state machine record of the finite state machine record set comprises (a) event data for a corresponding event and (b) a domain object state for a domain object corresponding to the corresponding event. The domain object state indicates the state of the domain object as a result of the corresponding event. The computer-executable program code instructions further comprise program code instructions configured to, when executed by a processor of a node computing entity of the plurality of node computing entities, generate a block comprising the finite state machine record set; and post the block to the user activity directory ledger.

According to still another aspect of the present invention, a method for generating a snapshot of a distributed ledger. The distributed ledger is stored by a plurality of node computing entities. In an example embodiment, the method comprises reading, by a first node computing entity of the plurality of node computing entities and comprising at least one processor, a memory, and a communications interface configured to communicate via at least one network, current states from a local cache stored by the node computing entity and corresponding to an application operating on the node computing entity; creating, by the first node computing entity, a new segment root block, wherein the new segment root block comprises the current states; closing, by the first node computing entity, a current segment data file stored in the memory; opening, by the first node computing entity, a new segment data file in the memory; writing, by the first node computing entity, the new segment root block to the new segment data file; and posting, by the first node computing entity, the new segment root block to the distributed ledger.

According to another aspect of the present invention, an apparatus for generating a snapshot of a distributed ledger is provided. The distributed ledger stored by a plurality of node computing entities and the apparatus being one of the plurality of node computing entities. In an example embodiment, the apparatus comprises at least one processor, a communications interface configured for communicating via at least one network, and at least one memory storing computer program code. The at least one memory and the computer program code configured to, with the processor, cause the apparatus to at least read current states from a local cache stored by the node computing entity and corresponding to an application operating on the node computing entity; create a new segment root block, wherein the new segment root block comprises the current states; close a current segment data file stored in the memory; open a new segment data file in the memory; write the new segment root block to the new segment data file; and post the new segment root block to the distributed ledger.

According to yet another aspect of the present invention, a computer program product for generating a snapshot of a distributed ledger is provided. The distributed ledger is stored by a plurality of node computing entities. In an example embodiment, the computer program product comprises at least one non-transitory computer-readable storage medium having computer-executable program code instructions stored therein. The computer-executable program code instructions comprise program code instructions configured to, when executed by a processor of a node computing entity of the plurality of node computing entities, read current states from a local cache stored by the node computing entity and corresponding to an application operating on the node computing entity; create a new segment root block, wherein the new segment root block comprises the current states; close a current segment data file stored in the memory; open a new segment data file in the memory; write the new segment root block to the new segment data file; and post the new segment root block to the distributed ledger.

According to still another aspect of the present invention, a method for providing user access to a set of data stored in a distributed ledger is provided. The distributed ledger is stored by a plurality of node computing entities. In an example embodiment, the method comprises receiving, by a first node computing entity of the plurality of node computing entities and comprising at least one processor, a memory, and a communications interface configured to communicate via at least one network, a share key request indicating that a first user account has authorized a second user account to have access to a set of data stored in the distributed ledger; encrypting, by the first node computing entity, a data access key for accessing the set of data using an encrypting key corresponding to the second user account; generating, by the first node computing entity, a block comprising the encrypted data access key; signing, by the first node computing entity, the block comprising the encrypted data access key using a signing key corresponding to the first user account; and posting, by the first node computing entity, the signed block comprising the encrypted data access key to the distributed ledger.

According to another aspect of the present invention, an apparatus for providing user access to a set of data stored in a distributed ledger. The distributed ledger is stored by a plurality of node computing entities. The apparatus is one of the plurality of node computing entities. In an example embodiment, the apparatus comprises at least one processor, a communications interface configured for communicating via at least one network, and at least one memory storing computer program code. The at least one memory and the computer program code configured to, with the processor, cause the apparatus to at least receive a share key request indicating that a first user account has authorized a second user account to have access to a set of data stored in the distributed ledger; encrypt a data access key for accessing the set of data using an encrypting key corresponding to the second user account; generate a block comprising the encrypted data access key; sign the block comprising the encrypted data access key using a signing key corresponding to the first user account; and post the signed block comprising the encrypted data access key to the distributed ledger.

According to yet another aspect of the present invention, a computer program product for providing user access to a set of data stored in a distributed ledger is provided. The distributed ledger stored by a plurality of node computing entities. In an example embodiment, the computer program product comprises at least one non-transitory computer-readable storage medium having computer-executable program code instructions stored therein. The computer-executable program code instructions comprise program code instructions configured to, when executed by a processor of a node computing entity of the plurality of node computing entities, receive a share key request indicating that a first user account has authorized a second user account to have access to a set of data stored in the distributed ledger; encrypt a data access key for accessing the set of data using an encrypting key corresponding to the second user account; generate a block comprising the encrypted data access key; sign the block comprising the encrypted data access key using a signing key corresponding to the first user account; and post the signed block comprising the encrypted data access key to the distributed ledger.

According to still another aspect of the present invention, a method for performing an immediate failover from a primary order book to a secondary order book is provided. The primary order book represents a current state of one or more orders according to a first node computing entity and a first ledger file and the secondary order book represents a current state of all orders according to a second node computing entity and a second ledger file. In an example embodiment, the method comprises processing, via a first node computing entity of the plurality of node computing entities and comprising a first processor, a first memory, and a first communications interface configured to communicate via at least one network, an input stream of order information to generate (a) a primary order book and (b) an output stream of order information, the output stream of order information comprising one or more blocks of a common block structure; storing, via the first node computing entity, the output stream of order information in a first ledger file in the first memory; reading, by the first node computing entity, the first ledger file and providing, via the communications interface, a secondary stream of order information read from the first ledger file; providing, by the first node computing entity, the secondary stream of order information; receiving, by a second node computing entity of the plurality of node computing entities and comprising a second processor, a second memory, and a second communications interface configured to communicate via at least one network, the secondary stream of order information; storing, via the second node computing entity, the order information of the secondary stream of order information in a second ledger file in the second memory; and processing, via the second node computing entity, the secondary stream of order information to generate a secondary order book.

According to another aspect of the present invention, a system for performing an immediate failover from a primary order book to a secondary order book is provided. The primary order book represents a current state of one or more orders according to a first node computing entity and a first ledger file and the secondary order book represents a current state of all orders according to a second node computing entity and a second ledger file. In an example embodiment, the system comprises a first node computing entity and a second node computing entity. The first node computing entity comprises at least one processor, a communications interface configured for communicating via at least one network, and at least one first memory storing computer program code. The at least one first memory and the computer program code configured to, with the processor, cause the first node computing entity to at least process an input stream of order information to generate (a) a primary order book and (b) an output stream of order information, the output stream of order information comprising one or more blocks of a common block structure, storing, via the first node computing entity, the output stream of order information in a first ledger file in the first memory, read the first ledger file and providing, via the communications interface, a secondary stream of order information read from the first ledger file, and provide the secondary stream of order information. The second node computing entity comprises at least one processor, a communications interface configured for communicating via at least one network, and at least one second memory storing computer program code. The at least one second memory and the computer program code configured to, with the processor, cause the second node computing entity to at least receive the secondary stream of order information, store the order information of the secondary stream of order information in a second ledger file in the second memory, and process the secondary stream of order information to generate a secondary order book.

According to yet another aspect of the present invention, a computer program product for performing an immediate failover from a primary order book to a secondary order book is provided. The primary order book represents a current state of one or more orders according to a first node computing entity and a first ledger file and the secondary order book represents a current state of all orders according to a second node computing entity and a second ledger file. In an example embodiment, the computer program product comprising at least one non-transitory computer-readable storage medium having computer-executable program code instructions stored therein. The computer-executable program code instructions comprise program code instructions configured to, when executed by a processor of a first node computing entity of the plurality of node computing entities process an input stream of order information to generate (a) a primary order book and (b) an output stream of order information, the output stream of order information comprising one or more blocks of a common block structure; store the output stream of order information in a first ledger file in the first memory; read the first ledger file and providing, via the communications interface, a secondary stream of order information read from the first ledger file; and provide the secondary stream of order information. A second node computing entity receives the secondary stream of order information, stores the order information of the secondary stream of order information in a second ledger file in the second memory, and processes the secondary stream of order information to generate a secondary order book.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is pseudocode of an example FSM record block, in an accordance with an example embodiment of the present invention;

Figure 7A:
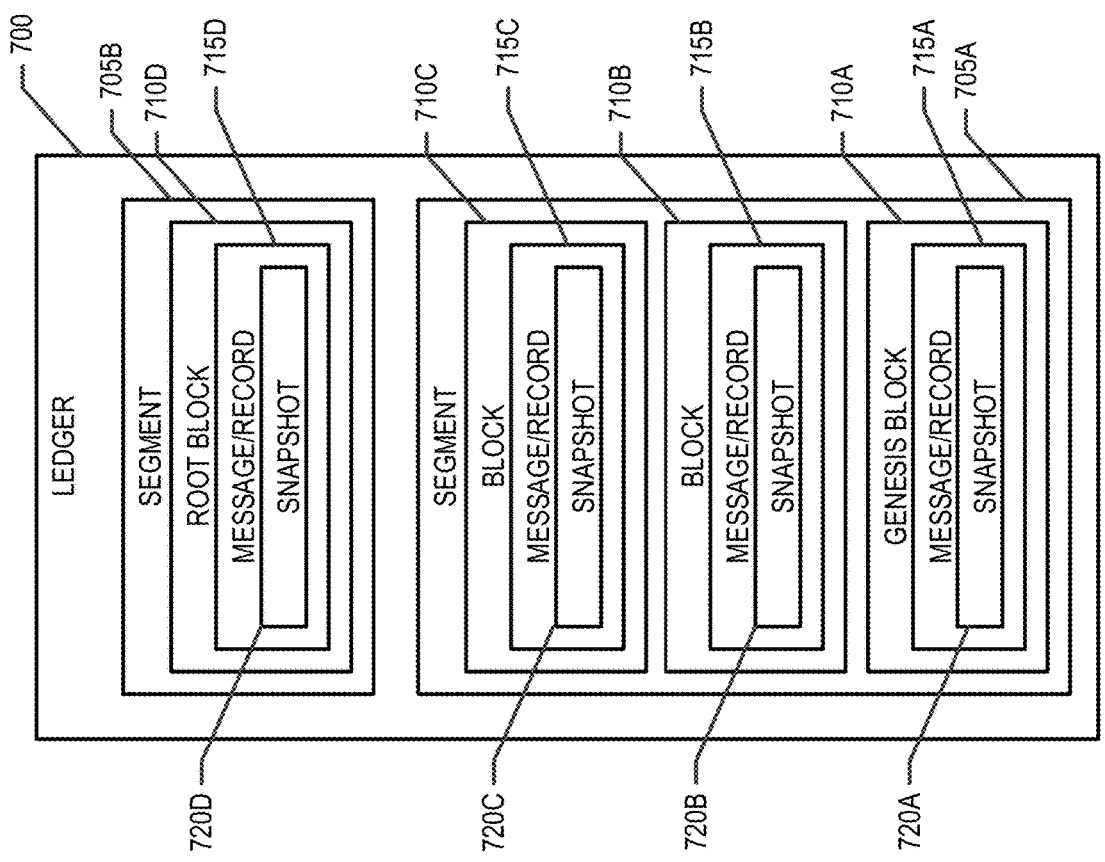
Figure 7B:
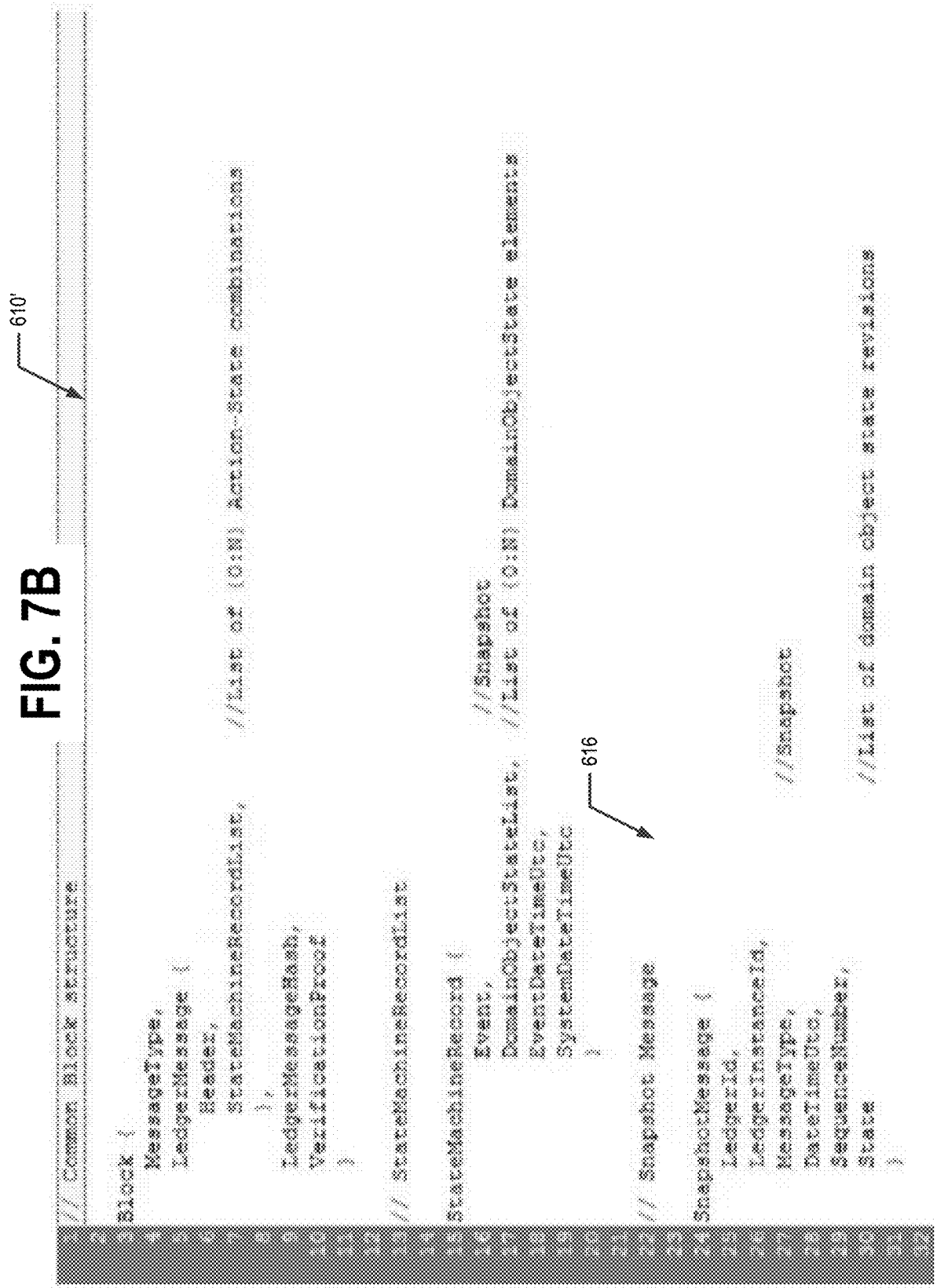
Figure 8:
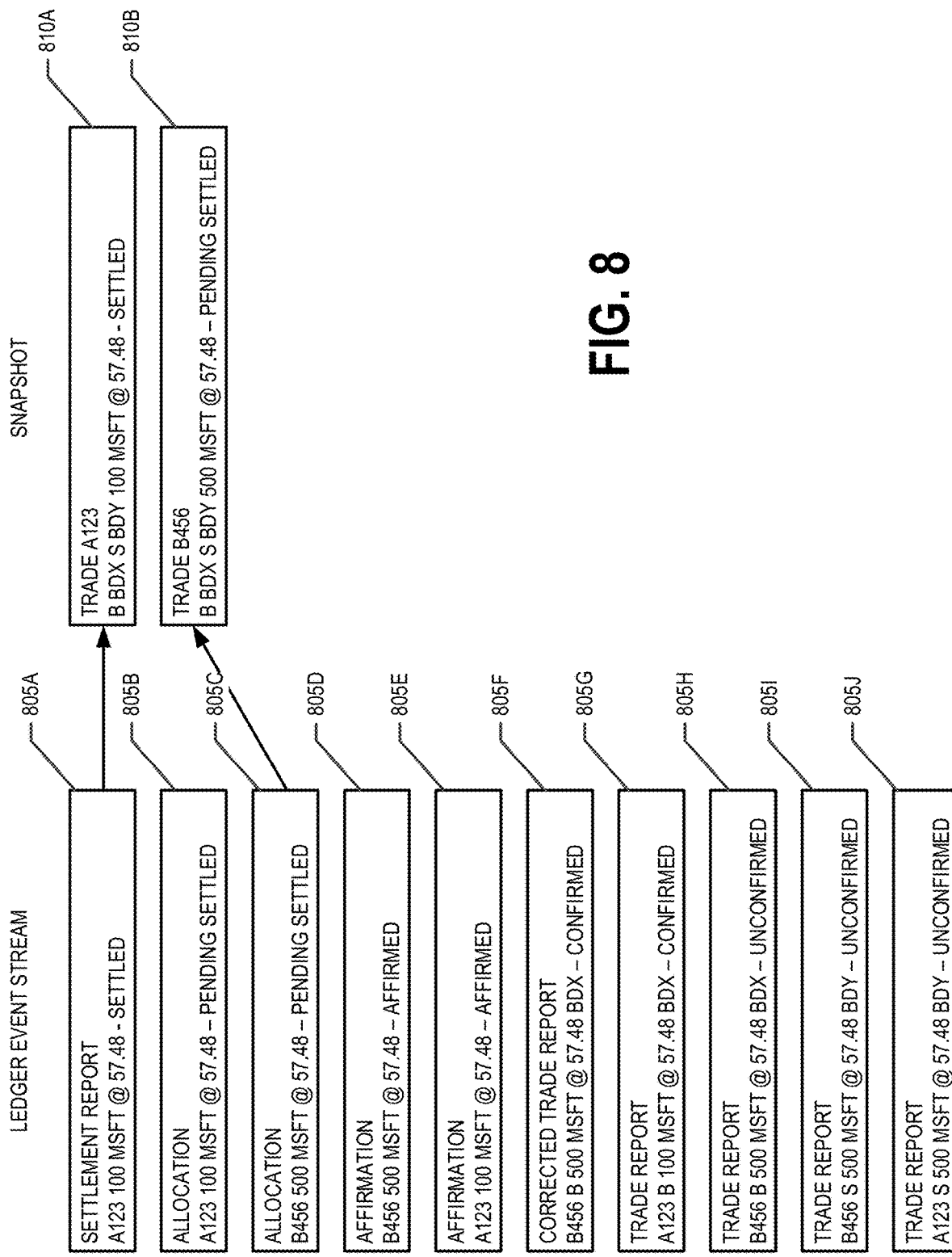
Figure 9:
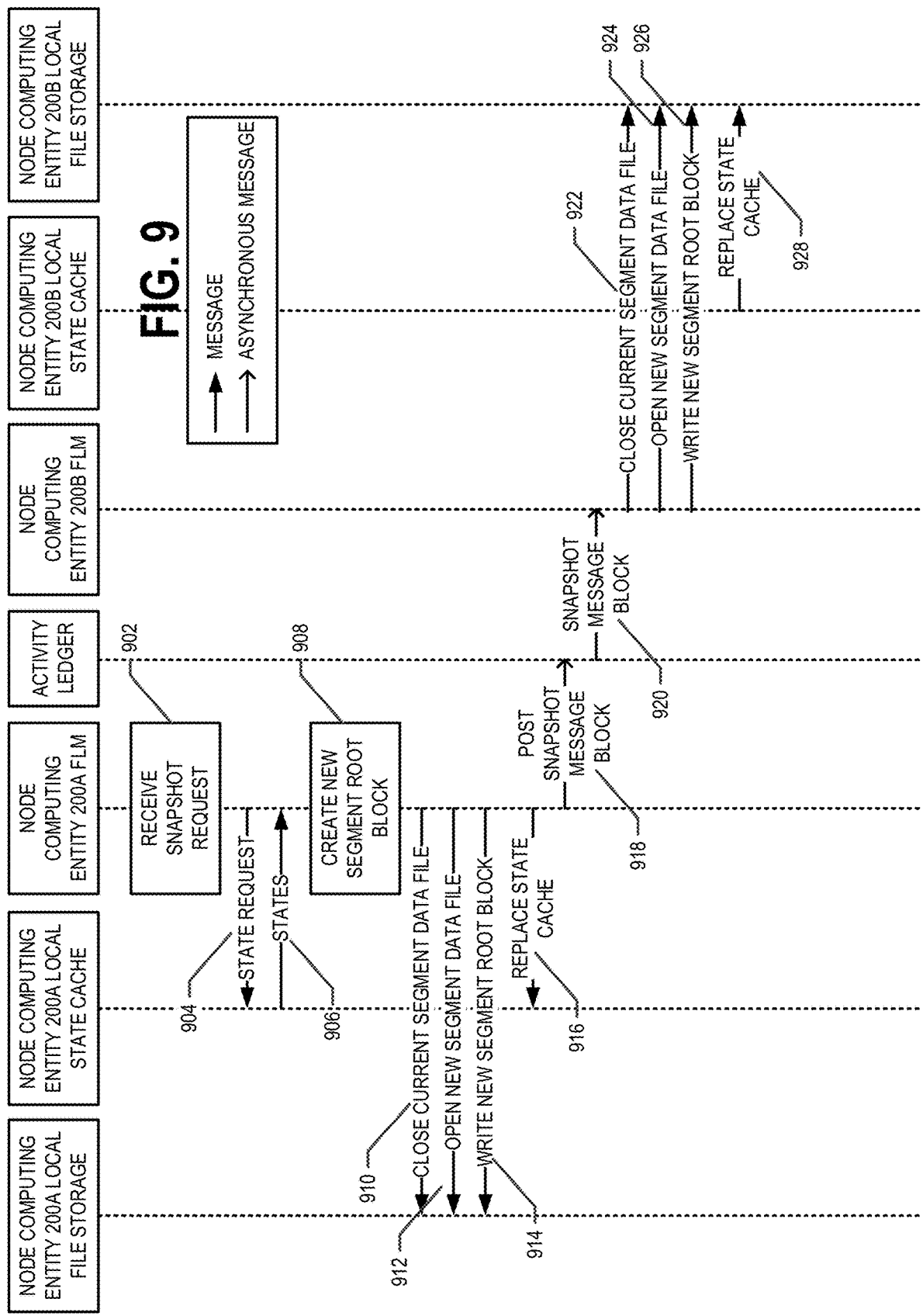
Figure 10:
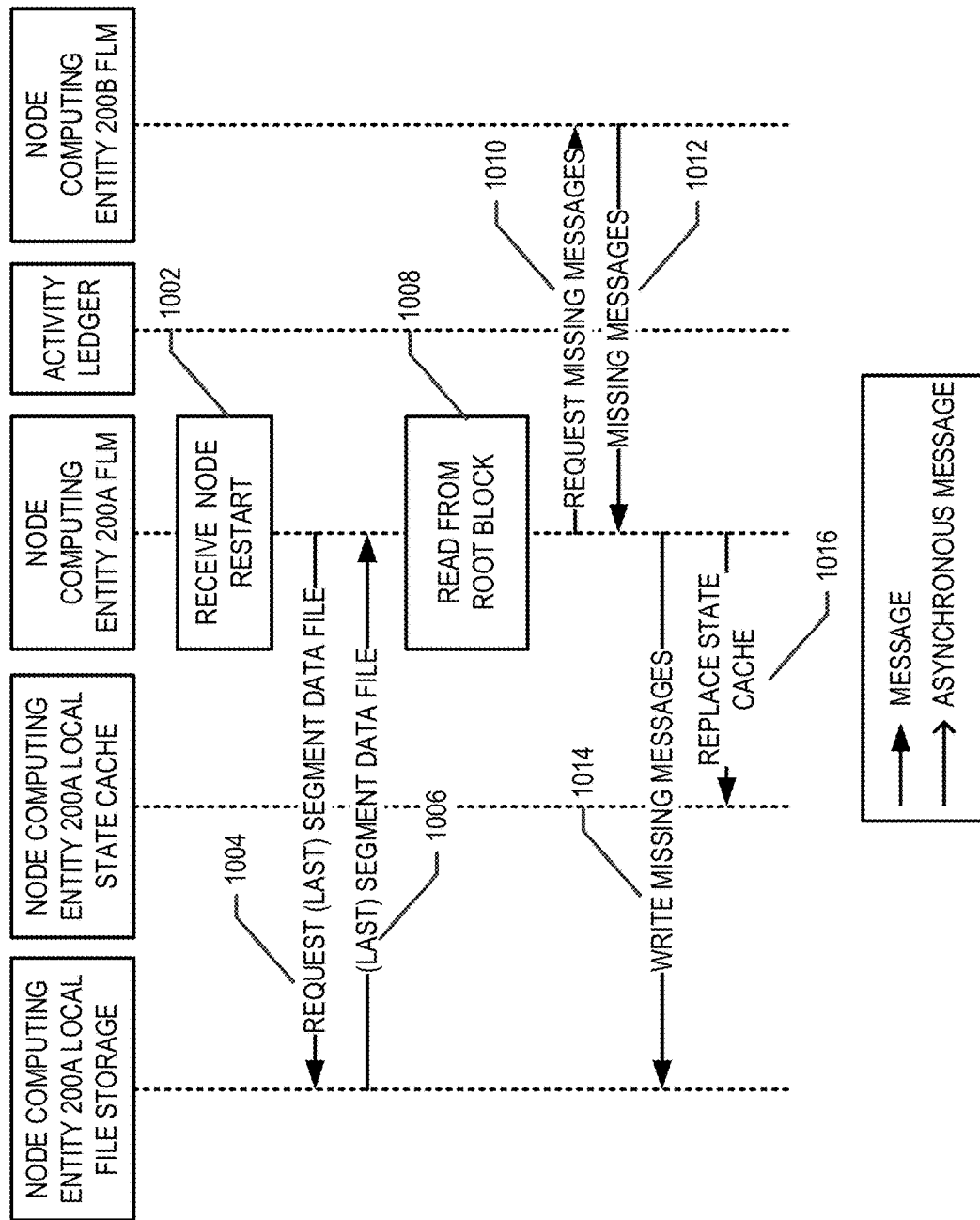
Figure 12:
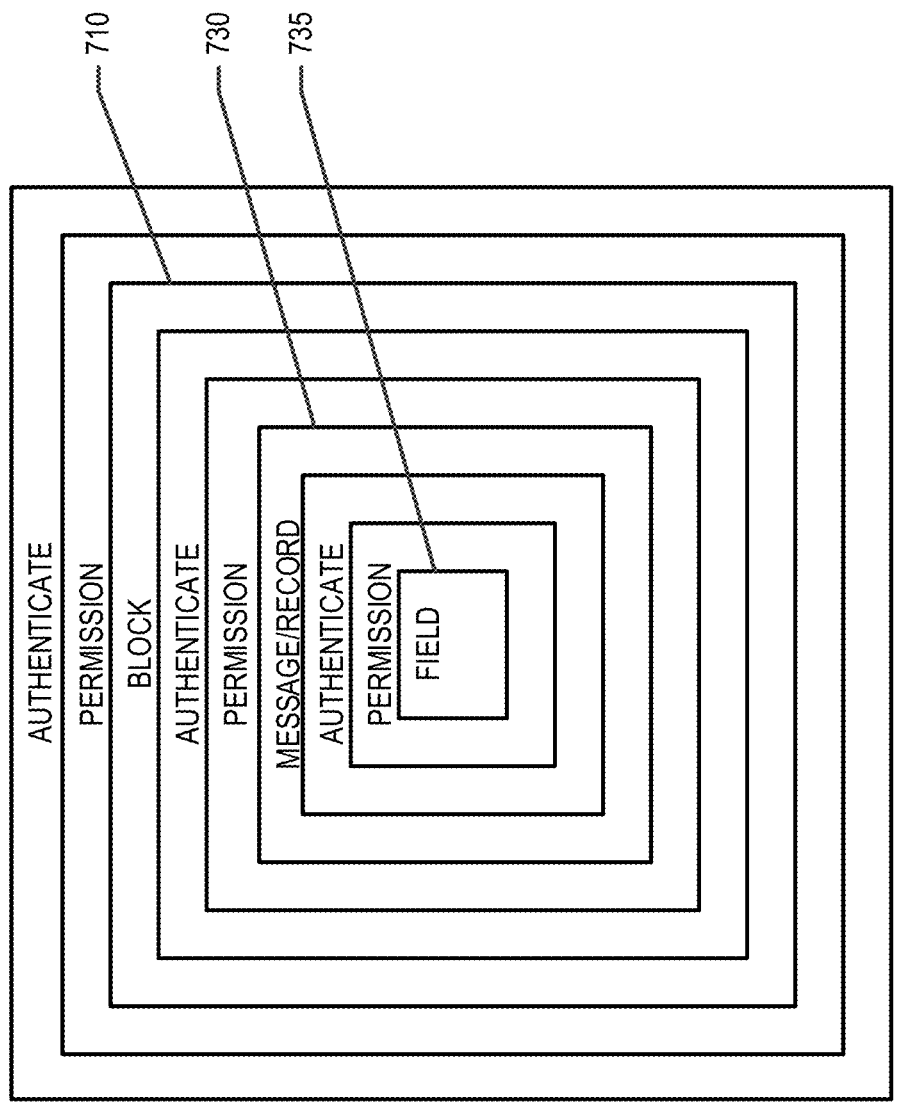
Figure 16:
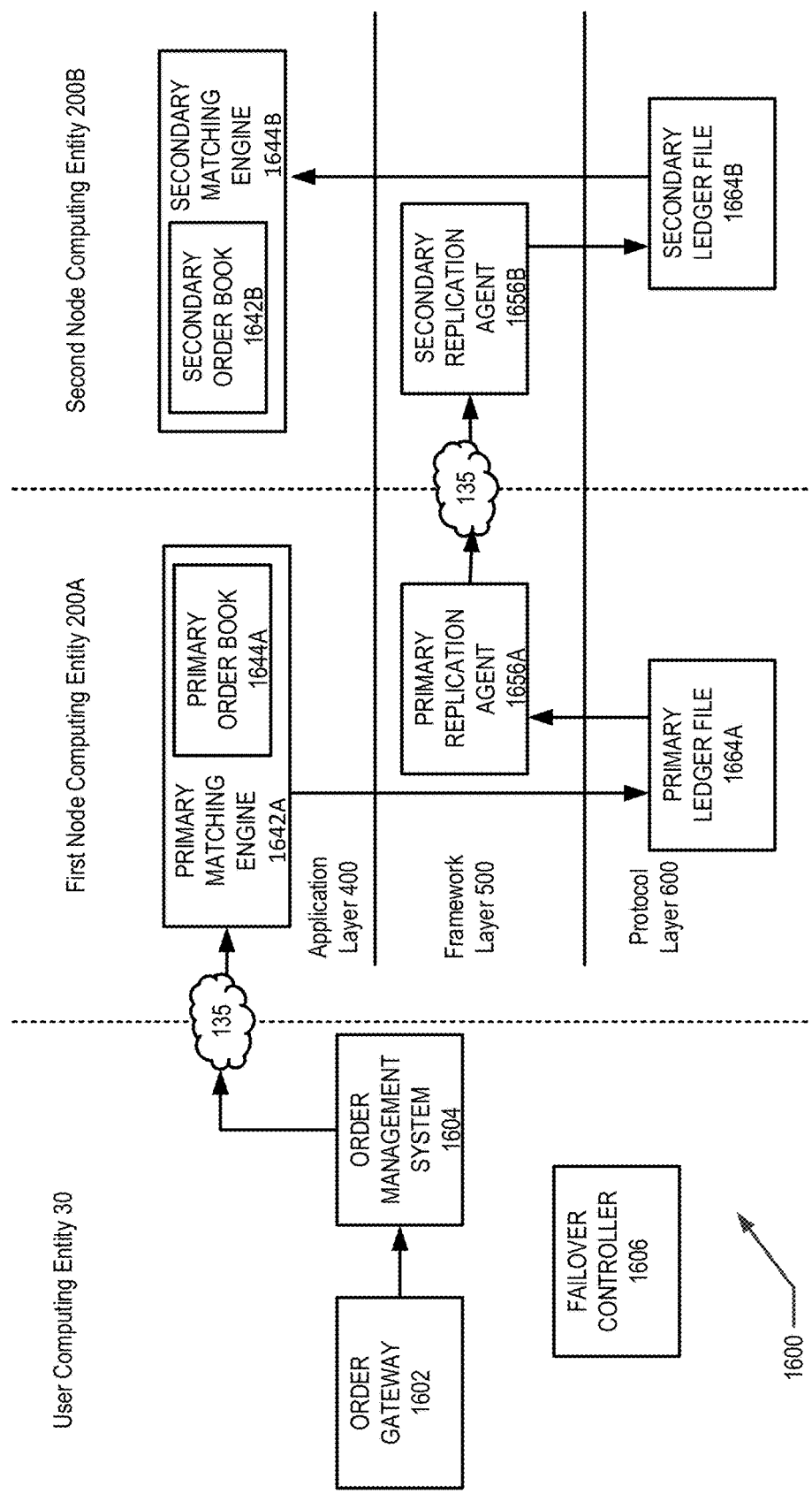

FIG. 6 provides a data flow diagram of a process of generating an FSM record block and posting the FSM record block to the distributed ledger, in accordance with an example embodiment of the present invention;

FIG. 7A is a schematic diagram of a portion of a ledger, in accordance with an example embodiment of the present invention;

FIG. 7B is pseudocode of an example snapshot message, in accordance with an example embodiment of the present invention;

FIG. 8 illustrates an example ledger event stream and the corresponding snapshot, in accordance with an example embodiment of the present invention;

FIG. 9 provides a flow diagram of a snapshotting process, in accordance with an example embodiment of the present invention;

FIG. 10 provides a flow diagram of a process of restarting a node computing entity using a snapshot, in accordance with an example embodiment of the present invention;

FIGS. 11A and 11B are tables describing some elements of the user access and data access control management, in accordance with an example embodiment of the present invention;

FIG. 12 is a schematic diagram of how a block of the ledger may be authenticated and access to the block may be permissioned, in accordance with an example embodiment of the present invention;

FIG. 13 is pseudocode of an example data access grant message, in accordance with an example embodiment of the present invention;

FIG. 14 provides a flow diagram of a process of creating a user account, in accordance with an example embodiment of the present invention;

FIG. 15 provides a flow diagram of a process of providing a data access to a user account, in accordance with an example embodiment of the present invention;

FIG. 16 is a schematic diagram of components of an immediate, automatic order book failover system, in accordance with an example embodiment of the present invention; and FIG. 17 provides a flow diagram of an operational process of an immediate automatic order book failover system when a failover occurs, in accordance with an example embodiment of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like numbers refer to like elements throughout.

Various embodiments of the present invention provide FSM records and/or messages that may be incorporated into FSM record blocks stored in a distributed ledger. In an example embodiment, a distributed ledger is a consensus of replicated, shared, and synchronized digital data and may be geographically spread across multiple locations, sites, geographical locations, countries, and/or institutions. In an example embodiment, the distributed ledger is a private ledger. User access to a private ledger may be administrated by an administrator. User accounts that provide user access to the private ledger may be limited to individuals, computing entities, and/or groups associated with and/or having membership in a particular organization, company, institution, group, and/or the like. The FSM records and/or messages record events and transformations corresponding to domain objects as a result of the events subject to semantics and rules enforced by the FSM system. The FSM records may further provide intrinsic bi-temporal primitives. For example, a current status of a domain object and a status of the domain object at a particular point in time may be easily determined based on the FSM records stored in the distributed ledger. The terms state and status are used interchangeably herein. According to the FSM system, each domain object is in exactly one of a finite set of deterministic states at any particular point in time. Various embodiments of the present invention may leverage distributed ledger technology to provide a common user account management, authentication, and data permissioning system via DAKs, which are themselves distributed via the common distributed ledger. Various embodiments of the present invention provide for generating a snapshot comprising the current state of domain objects according to the distributed ledger. The snapshot may be posted to the distributed ledger and used for point-in-time restart and initiation of node computing entities. Various embodiments of the present invention provide an immediate, automated order book failover system which provides immediate, automated failover from a primary order book to a secondary order book in response to detection of a trigger event.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

Figure 1A:
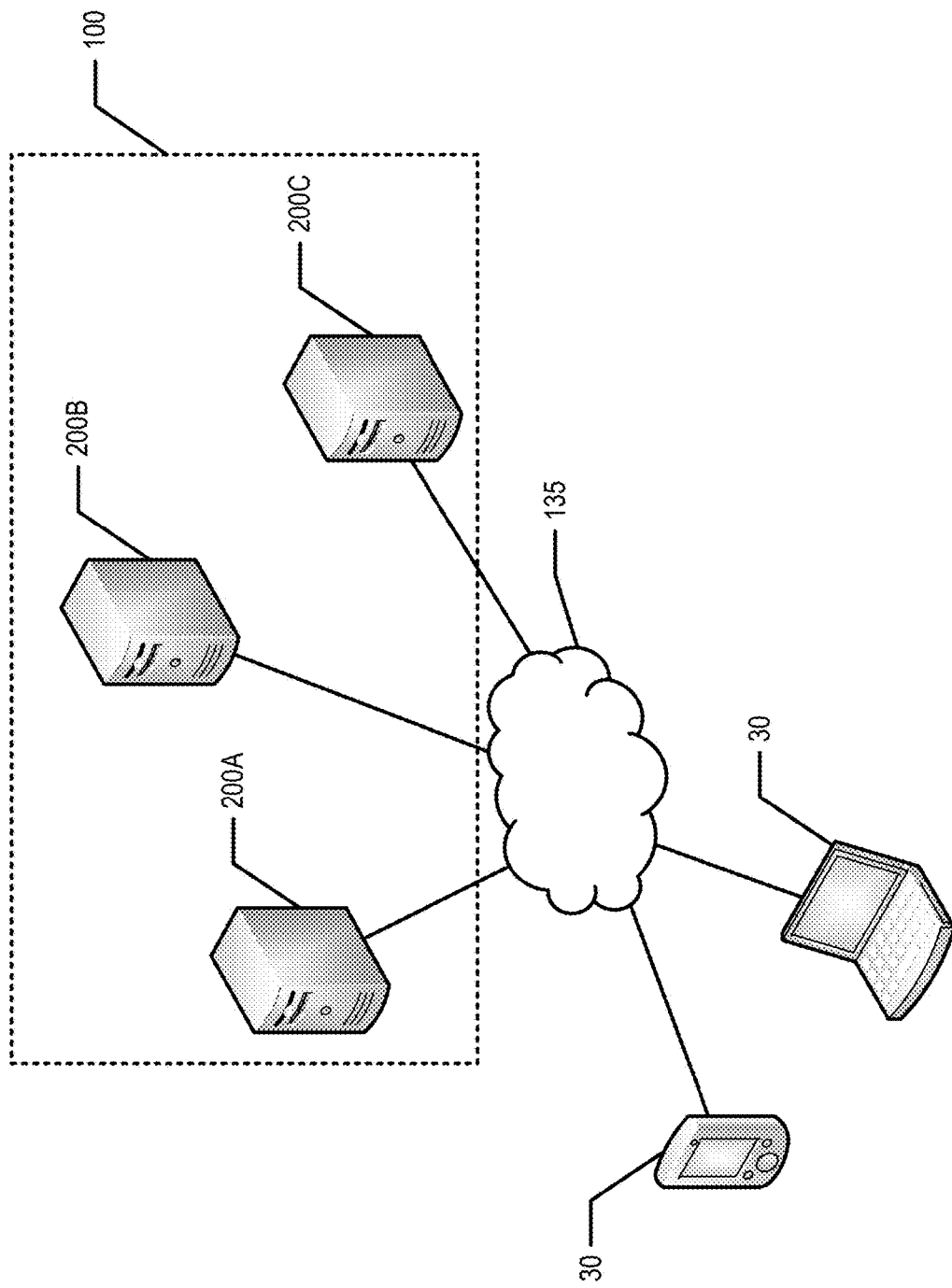
FIG. 1A is a diagram of a system that can be used to practice various embodiments of the present invention.
Figure 1B:
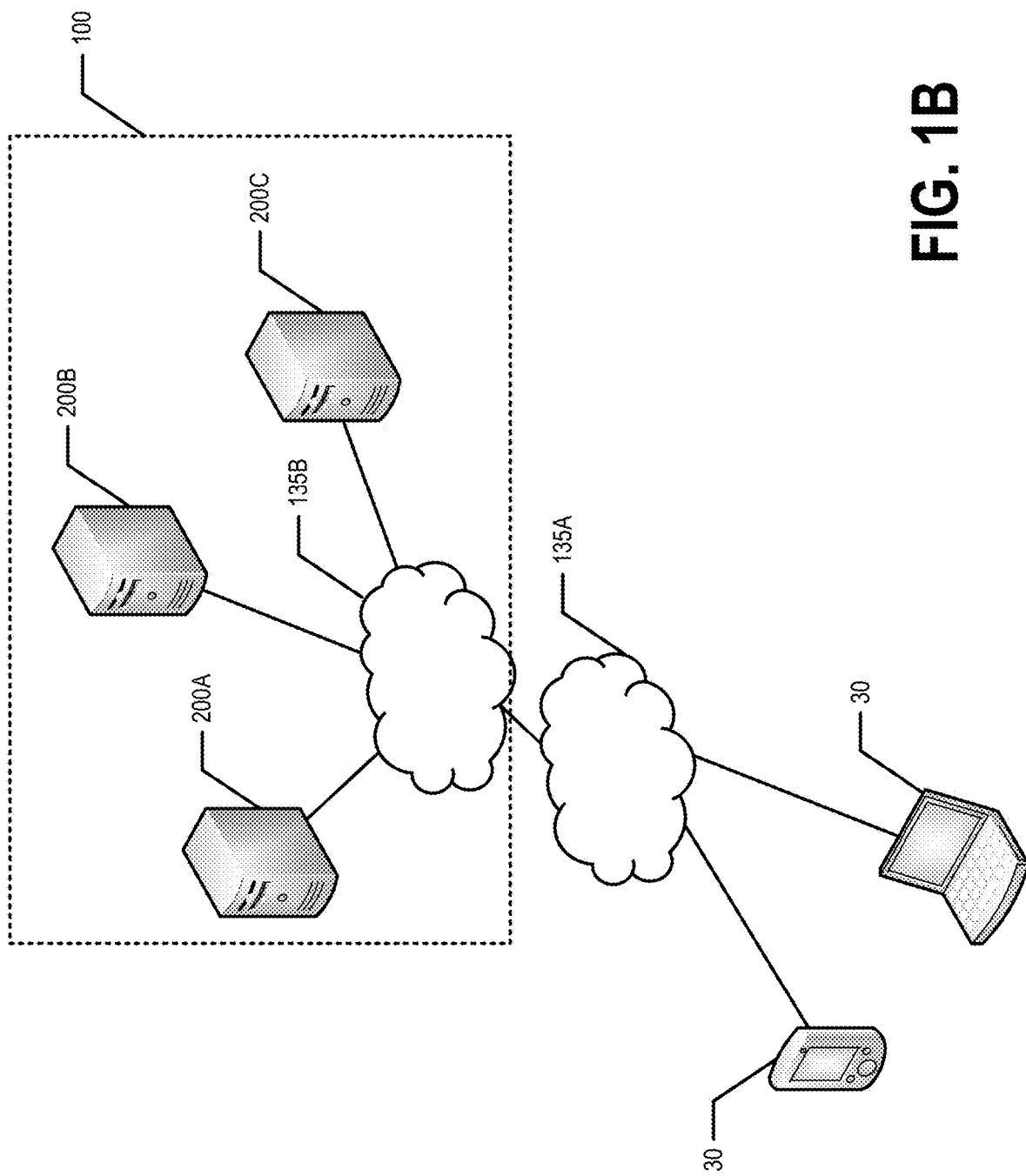
FIG. 1B is a diagram of another system that can be used to practice various embodiments of the present invention.

FIG. 1A provides an illustration of a system that can be used in conjunction with various embodiments of the present invention. As shown in FIG. 1A, the system may comprise a distributed ledger network 100 comprising two or more node computing entities 200, 200'. As shown in FIG. 1A, the system may further comprise one or more user computing entities 30, one or more networks 135, and/or the like. FIG. 1B provides an illustration of another system that can be used in conjunction with various embodiments of the present invention. As shown in FIG. 1B, the system may comprise a distributed ledger network 100 comprising two or more node computing entities 200, 200' and one or more internal networks 135B. As shown in FIG. 1B, the system may further comprise one or more user computing entities 30, one or more other networks 135A, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Node Computing Entity

Figure 2:
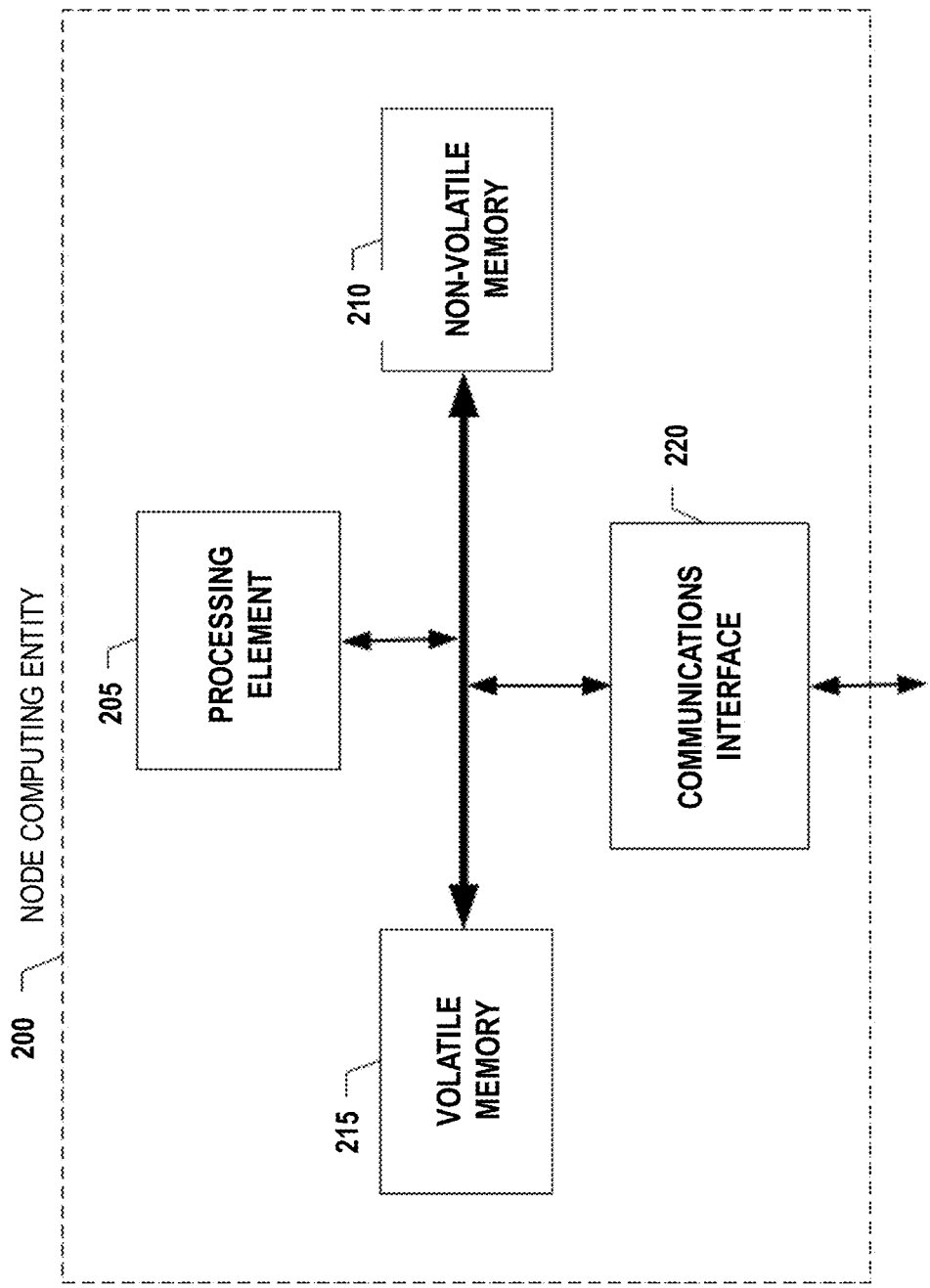
FIG. 2 is a schematic of a computing entity in accordance with certain embodiments of the present invention.

FIG. 2 provides a schematic of a node computing entity 200 (e.g., 200A, 200B, 200C) according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the node computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with other node computing entities 200, 200', one or more user computing entities 30, and/or the like.

As shown in FIG. 2, in one embodiment, the node computing entity 200 may include or be in communication with one or more processing elements 205 (also referred to as processors, processing circuitry, and/or similar terms used herein interchangeably) that communicate with other elements within the node computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the node computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the node computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the node computing entity 200 with the assistance of the processing element 205 and operating system.

As indicated, in one embodiment, the node computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with computing entities or communication interfaces of other node computing entities 200, 200', and/or the like.

As indicated, in one embodiment, the node computing entity 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the node computing entity's 200 components may be located remotely from other node computing entity 200 components, such as in a distributed system. Furthermore, one or more of the components may be combined and additional components performing functions described herein may be included in the node computing entity 200. Thus, the node computing entity 200 can be adapted to accommodate a variety of needs and circumstances.

In example embodiments, the node computing entity 200 may be in communication with one or more other node computing entities 200, 200' and/or one or more user computing entities 30. In example embodiments, the node computing entity 200 may be in communication with one or more other node computing entities 200, 200' configured for creating, reading, providing and/or receiving one or more ledger blocks, DAKs, data signature authorization (DSA) keys, encryption keys (DHM), and/or the like and distributing such via the distributed ledger.

b. Another Exemplary Node Computing Entity

Figure 3:
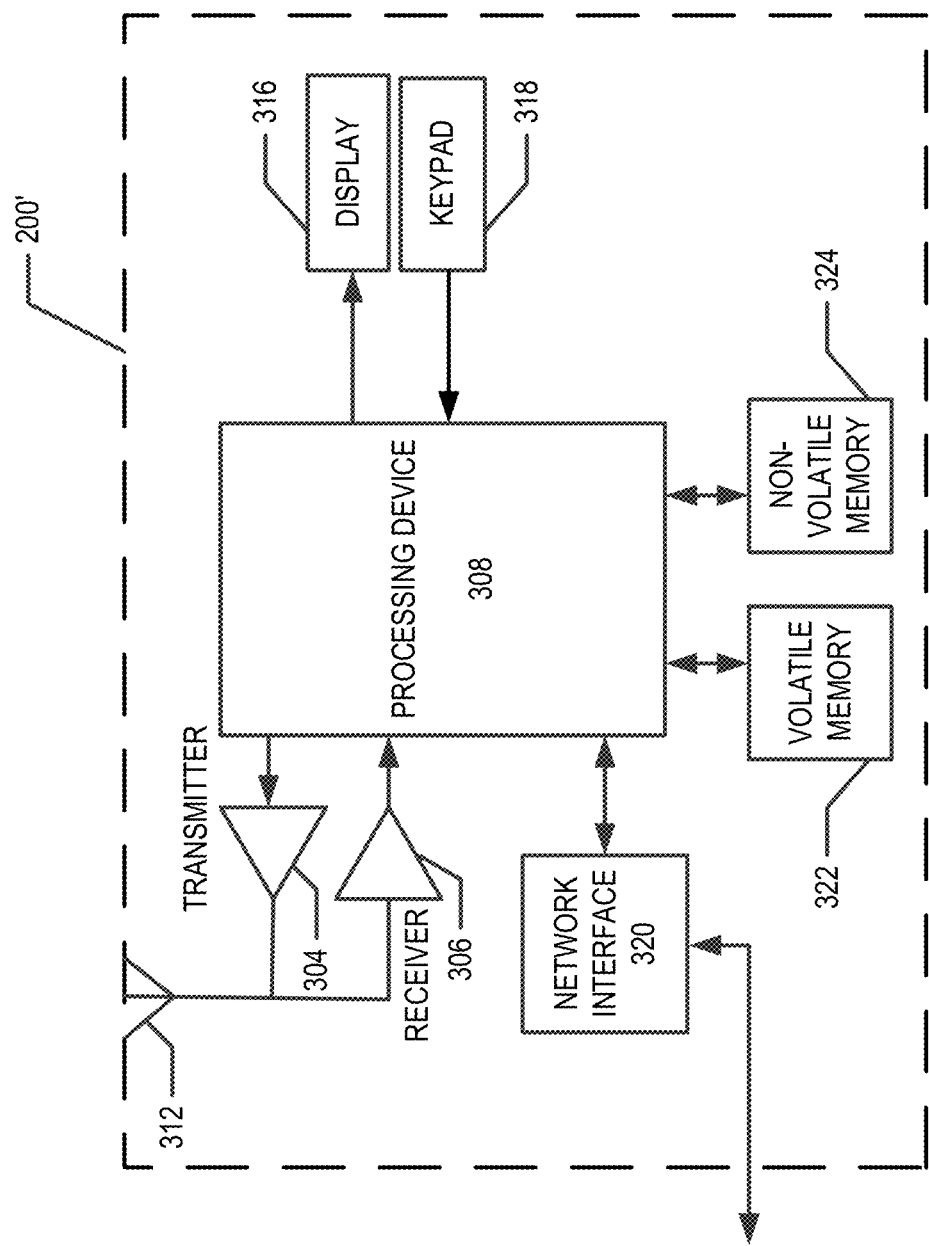
FIG. 3 is a schematic of another computing entity in accordance with certain embodiments of the present invention.

FIG. 3 provides an illustrative schematic representative of a node computing entity 200' that can be used in conjunction with embodiments of the present invention. As shown in FIG. 3, a node computing entity 200' can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as another node computing entity 200, 200', one or more user computing entities 30, and/or the like. In this regard, the node computing entity 200' may be capable of operating with one or more air interface standards, communication protocols, modulation types, and access types. More particularly, the node computing entity 200' may operate in accordance with any of a number of wireless communication standards and protocols. In a particular embodiment, the node computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the node computing entity 200' can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The node computing entity 200' can also download changes, add-ons, and updates, for instance, to its firmware, software (e.g., including executable instructions, applications, program modules), and operating system.

According to one embodiment, the node computing entity 200' may include location determining aspects, devices, modules, functionalities, and/or similar words used herein interchangeably. For example, the node computing entity 200' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the node computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The node computing entity 200' may also comprise a user interface (that can include a display 316 coupled to a processing element 308) and/or a user input interface (coupled to a processing element 308). For example, the user interface may be an application, browser, user interface, dashboard, webpage, and/or similar words used herein interchangeably executing on and/or accessible via the node computing entity 200' to interact with and/or cause display of information. The user input interface can comprise any of a number of devices allowing the node computing entity 200' to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the node computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the node computing entity 200' can collect contextual information/data, telemetry, information/data, and/or the like.

The node computing entity 200' can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2

SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the node computing entity 200'.

c. Exemplary User Computing Entity

In an example embodiment, a user computing entity 30 may be a computing entity configured for user interaction (e.g., via a user interface thereof) for providing an order to a system corresponding to the distributed ledger, to perform administrative functions corresponding to the distributed ledger (e.g., create new user accounts within the distributed ledger, request data access be granted to a user account, and/or the like). In an example embodiment, a user computing entity 30 may be a node computing entity 200, 200'. In an example embodiment, a user computing entity 30 is a lightweight node of the distributed ledger. In another example embodiment, the user computing entity 30 is not a node of the distributed ledger, but may communicate with one or more node computing entities 200, 200' via one or more wired or wireless networks. In one embodiment, the user computing entity 30 may include one or more components that are functionally similar to those of a node computing entity 200, 200'. For example, in one embodiment, a user computing entity 30 may include: (1) a processing element that communicates with other elements via a system interface or bus; (2) a user interface (e.g., display, touch-screen display, hard or soft keyboard, mouse, and/or the like); (3) transitory and non-transitory memory; and (4) a communications interface configured to communicate via one or more wired or wireless networks (e.g., network 135). For example, the user computing entity 30 may receive user input (e.g., via the user interface thereof) and provide (e.g. transmit) an indication of the user input to one or more node computing entities 200, 200' (e.g., via the communications interface).

d. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), metropolitan area networks (MANs), wide area networks (WANs), local area networks (LANs), or personal area networks. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operation

Example embodiments provide a private distributed ledger comprising FSM records and/or messages. In an example embodiment, a ledger is a permanent and/or immutable summary of activities and/or transactions affecting and/or corresponding to one or more domain objects. In an example embodiment, a distributed ledger is a database, data store, and/or the like that is stored by multiple node computing entities 200, 200'. For example, a distributed ledger is a consensus of replicated, shared, and synchronized digital data stored at multiple sites, geographic locations, institutions, and/or the like. For example in an example embodiment, the distributed ledger is not stored in a centralized data storage. For example, the distributed ledger may be a blockchain. For example, the distributed ledger may be an activity ledger, wherein an activity ledger registers activities (typically representing transactions) and facts about those transactions. In an example embodiment, a private distributed ledger is a distributed ledger for which access to and/or inclusion therein is permissioned. For example, user access to a private distributed ledger may be administrated by an administrator. For example, access to the distributed ledger may be provided via user accounts. The user accounts and access thereto may be limited to individuals, computing entities, and/or groups associated with and/or having membership in a particular organization, company, institution, group, and/or the like. For example, a user account with administrative capabilities and/or functions may need to create new user accounts and/or provide permission for the creation of new user accounts. Similarly, for a new node computing entity 200, 200' to be added to the distributed ledger network 100, a user account with administrative capabilities or functions may need to provide permission for the addition of the new node computing entity 200, 200' in the distributed ledger network 100. As used herein, the distributed ledger network 100 is the group of node computing entities 200, 200' storing the distributed ledger.

Various embodiments of the present invention provide FSM records and/or messages that may be incorporated into FSM record blocks stored in the distributed ledger. The FSM records record events and transformations corresponding to domain objects as a result of the events and subject to semantics and rules enforced by the FSM system. In various embodiments, the domain objects may comprise one or more accounts, one or more inventories of one or more physical or non-physical items, one or more orders, one or more information/data instances corresponding to a particular application, and/or the like. For example, the domain objects are the "nouns" of activities stored in the FSM record blocks and the activity events are the "verbs" that cause state transitions of the domain objects to occur. An activity event may affect the state of more than one domain object at a time.

In an example embodiment, each domain object may correspond to an event counter. Each time an event corresponding to the domain object occurs, is recorded, and/or the like, the event counter may be incremented. The domain object may then be "versioned" by the event counter corresponding to that domain object. For example, if the event counter for a first domain object is at 5, the fifth version of the first domain object is the current version and the first, second, third, and fourth versions of the first domain object correspond to the state of the first domain object at previous points in time and as a result of previous events.

The FSM records may further provide intrinsic bi-temporal primitives, according to an example embodiment. For example, a current status of a domain object and a status of the domain object at a particular point in time may be easily determined based on the FSM records stored in the distributed ledger. For example, the versioning of the domain objects and the corresponding event counter allow for the current or a previous state at a particular time of a domain object to be efficiently determined. For example, according to the FSM system, each domain object is in exactly one of a finite set of deterministic states at any particular point in time. When an event occurs that changes the status of the domain object, an FSM record and/or message is recorded detailing the event and indicating the resulting state of the domain object. In an example embodiment, a common block structure may be used to record activity events (e.g., business activities and/or events, transactions, and/or the like), user account events (e.g., creation of new user accounts, a data access grant being provided to a user account, and/or the like), and for generating and recording system snapshots. In an example embodiment, a snapshot is a composite record of eligible domain objects and indicates the state of each of the eligible domain objects at the time the snapshot is generated. The eligible domain objects are determined from the set of system domain objects based on eligibility rules that may be application dependent, as is described in more detail below. In an example embodiment, activity events and the corresponding transaction information/data is comprehensively and sequentially recorded so as to enable the business rules and/or data governance to be deterministic. For example, the comprehensive and sequential recording of the activity events allows the exact state of one or more domain objects to be definitively determined at a current time and/or at a particular time in the past. Moreover, each FSM record and/or message, of an example embodiment, comprises both the activity event information/data and the resulting domain object states, making the current state and previous states of domain objects easy to determine.

Figure 4:
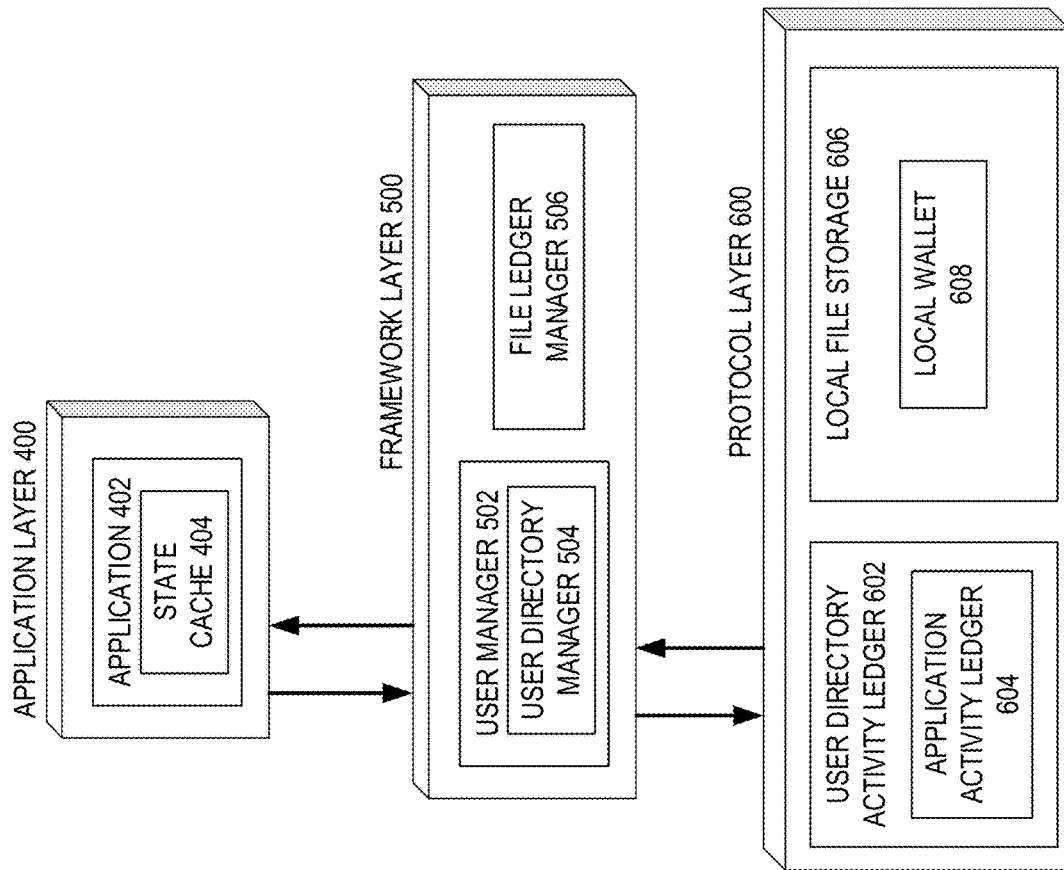
FIG. 4 is a schematic of a system framework, in accordance with an example embodiment of the present invention.

In various embodiments, an FSM system framework is used to provide and make use of the distributed ledger. FIG. 4 provides a schematic diagram of the FSM system framework. An application layer 400 is configured to operate one or more applications 402. One application 402 is shown for clarity, however, it should be understood that a plurality of applications 402 may operate in the application layer 400. Each application 402 may comprise, store, and/or be in communication with a state cache 404. The state cache 404 may store the current state of one or more domain objects corresponding to the application 402. For example, the application 402 may be a matching engine 1642A, 1642B (see FIG. 16) operating on a node computing entity 200, 200' and the state cache 404 may be an order book 1644A, 1644B. For example, the matching engine 418, 440 may match order events provided via an inbound order stream to orders (e.g., domain objects) and update the status of the orders based on the inbound order stream information/data. The order books 1644A, 1644B may store a current state of all open orders. Returning to FIG. 4, the protocol layer 600 may comprise a user directory activity ledger 602 storing blocks comprising FSM records and/or messages corresponding to events. In an example embodiment, the user directory activity ledger 602 is a distributed ledger of the distributed ledger network 100. For example, the user directory activity ledger 602 may comprise one or more application activity ledgers 604 storing activities corresponding to application 402 and one or more user accounts that exist within the user directory activity ledger 602. For example, an application activity ledger 604 may comprise a binary order ledger 1664A, 1664B (see FIG. 16) and/or the like. The protocol layer 600 may further comprise a local file storage 606. The local file storage 606 may comprise one or more data structures stored locally by a node computing entity 200, 200'. For example, the local file storage 606 may comprise one or more ledger files corresponding to the distributed ledger. In an example embodiment, the local file storage 606 may comprise a local wallet 608 for locally storing one or more keys (e.g., DAKs, user authentication keys, user signing keys, user encryption keys, user decryption keys, and/or the like), user information/data corresponding to one or more user accounts, and/or the like.

As shown in FIG. 4, a framework layer 500 acts as an intermediary between the application layer 400 and the protocol layer 600. For example, the framework layer 500 provides infrastructure and support services to the application layer 400 and abstracts the file system, distributed ledger network 100, and internode messaging capabilities of the protocol layer 600. For example, the framework layer acts as an intermediary between the services and operations of the applications 402 and the FSM record blocks stored in the ledger. In an example embodiment, the framework layer 500 may perform one or more validation and/or consensus procedures, as described in more detail below. For example, the node computing entities 200, 200' may use the framework layer 500 to interoperate with one another for the proposal of new blocks and subsequent validation and consensus procedures.

In an example embodiment, the framework layer 500 comprises a user manager 502. In an example embodiment, the user manager 502 provides a mechanism for managing (within the memory of the node computing entities 200, 200') the persistence of user information/data and keys. In an example embodiment, the user manager 502 comprises a user directory manager 504. In an example embodiment, the user directory manager 504 is a sub-component of the user manager 502 that performs the interactions with the user directory activity ledger 602. For example, the user directory manager 504 may generate, publish, and/or post FSM record blocks to the user directory activity ledger 602, access and/or read data from the user directory activity ledger 602, and/or the like. In an example embodiment, the framework layer 500 comprises a file ledger manager (FLM) 506. In an example embodiment, the FLM 506 may be configured for generating and/or constructing and publishing and/or posting snapshots to the distributed ledger. For example, the FLM 506 may be configured to generate and/or construct a genesis message block for posting at the beginning of a new FSM record block and/or a new ledger file of the distributed ledger.

A traditional smart contract is a computer protocol and/or set of computer-executable instructions and/or code intended and/or configured to facilitate, verify, and/or enforce the negotiation or performance of a contract. Smart contracts generally are embedded into and/or within blocks of a distributed ledger or blockchain. According to an example embodiment, the FSM framework may implement the functionality of smart contracts without using smart contracts. In particular, in an example embodiment, the framework layer 500 may be configured to execute FSM rules comprising computer-executable instructions and/or code that provide the functional equivalence of a smart contract. In an example embodiment, the framework layer 500 (e.g., user manager 502, FLM 506) is a software architecture and/or platform provided by the execution of FSM rules by a node computing entity 200, 200'. For example, the FSM rules comprising computer-executable instructions and/or code may be deployed directly to the node computing entities 200, 200' of the distributed ledger network 100 rather than to the distributed ledger itself. Thus, the framework layer 500 (e.g., the user manager 502, FLM 506), which are provided by the execution of the FSM rules by a node computing entity 200, 200', facilitate, verify, and/or enforce the negotiation or performance of a contract and/or system rules corresponding to the distributed ledger and/or various applications associated therewith. This provides the advantages of being able to easily debug the computer-executable instructions and/or code of the FSM rules. For example, a smart contract is deployed via the blockchain itself therefore causing the smart contract to be immutably stored alongside the data stored in the blockchain, which may cause issues when bugs within the smart contract are discovered. By deploying the FSM rules to the node computing entities 200, 200' themselves, rather than storing the FSM rules to the distributed ledger or blockchain itself, issues and/or bugs within the computer-executable instructions and/or code of the FSM rules may be easily resolved. For example, the FSM rules may be versioned and deployed independently for easy issue and/or bug resolution. Additionally, the use of FSM rules, rather than smart contracts, provides an improvement to the distributed ledger network 100 in that the FSM rules allow for faster processing while minimizing the amount of data transmitted over the network, minimizing the amount of data persisted via the distributed ledger, and permits the use of common development languages. Thus, the FSM rules provide improved performance, reliability, and maintainability than traditional smart contracts.

As described above, the distributed ledger stores FSM record blocks comprising FSM records and/or messages. The FSM record blocks have a common structure that is used for storing FSM records and/or messages corresponding to application activity events, business activity events, use account events, snapshots, and/or the like. FIG. 5 provides pseudocode illustrating the common FSM record block structure 610. For example, the common block structure may comprise a message type, a ledger message comprising a header comprising a list of FSM records and/or messages stored in the block, a ledger message hash, verification proof, and/or the like. In an example embodiment, a hash is the resulting value of a hash function and a particular input. For example, the ledger message hash may be the resulting value of a hash function and the ledger message, the ledger message of the previous block, and/or the like. In an example embodiment, a hash function is a function that can be used to map data (e.g., a character string, set of character strings, and/or the like) of arbitrary size to a data value of a fixed size. The resulting data value of the fixed size is the hash of the input. In an example embodiment, the hash is a Merkle root. The verification provides proof of the verification and/or validation of the FSM record block. For example, before an FSM record block is posted to the distributed ledger, the FSM record block is verified and/or validated, as will be described in more detail below. The header of the FSM record block may comprise information/data providing proof of the verification and/or validation of the FSM record block. For example, the FSM record block may be signed using one or more signing keys (e.g., a digital signature algorithm (DSA) key) configured to authenticate the node computing entities 200, 200' that performed the validation and/or verification of the FSM record block and/or that generated the one or more FSM records and/or messages.

The FSM record block may further comprise a list of FSM records and/or messages. An FSM record and/or message comprises a plurality of record fields. In an example embodiment, the record fields may comprise an event field configured for identifying the event and/or event type, one or more domain object fields identifying one or more domain objects and/or a current state corresponding to each of the identified domain objects, time and date fields for indicating the time and/or date that the event occurred, and/or other fields comprising information/data corresponding to the event. In an example embodiment, the FSM record and/or message may comprise an event counter field corresponding to one or more of the domain objects such that the version of the domain objects identified in the domain object fields may be efficiently determined. In an example embodiment, the FSM record and/or message may be signed with the private user authentication key (e.g., a DSA key) corresponding to a user account involved in the event, responsible for processing the event, and/or the like. In an example embodiment, an FSM record and/or message and/or one or more fields thereof may be encrypted with a public data access key (e.g., a Diffie-Hellman-Merkle (DHM) key) corresponding to one or more user accounts with permission to access the information/data of the FSM record and/or message and/or the one or more fields thereof.

a. Posting FSM Record Blocks to the Distributed Ledger

FIG. 6 illustrates a flow diagram of generating and posting an FSM record block to the distributed ledger, according to an example embodiment. In an example embodiment, the FSM record block comprises one or more FSM records and/or messages each corresponding to an event. In an example embodiment, an FSM record and/or message comprises event information/data (e.g., one or more of an event field, time and date fields, and/or other fields comprising information/data corresponding to the event) and domain object information/data (e.g., one or more domain object fields) comprising a status of each of the identified domain objects as a results of the event. For example, the domain object information/data may identify each domain object involved and/or affected by the event, indicate a current status of the domain object as a result of the event, comprise an event counter corresponding to the domain object, and/or the like, in an example embodiment.

Starting at 652, an FSM record and/or message set may be generated, created, compiled, and/or the like. For example, one or more events may occur triggering the generation, creation, compilation, and/or the like of one or more FSM records and/or messages. In an example embodiment, each FSM record and/or message corresponds to one event, one snapshot, one user account event (e.g., creation of a user account, editing of a user account, providing of a DAK to a user account, and/or the like). For example, an FSM record and/or message may correspond to a business or other activity such as an order, a trade offering, or other event occurring within and/or triggered by an application 402. In an example embodiment, an FSM record and/or message may correspond to the creation of a new user account, the granting of permission to a particular set of data to a user account (e.g., the FSM record and/or message may provide the user account with a DAK), and/or other administrative action for managing a user account. In an example embodiment, an FSM record and/or message may be a snapshot comprising a composite record of eligible domain objects and indicates the state of each of the eligible domain objects at the time the snapshot is generated. For example, the FSM record and/or message set may be generated, created, compiled, and/or the like by an application 402 operating on a first node computing entity 200A. For example, the first node computing entity 200A may comprise a processing element 205 configured for executing application program code for the application 402 (e.g., stored in memory 210, 215), the application 402 configured to generate, create, compile, and/or the like an FSM record and/or message set. Each FSM record and/or message of the FSM record and/or message set corresponding to an event occurring within and/or corresponding to the application 402.

At 654, the FSM record and/or message set is provided, submitted, and/or the like for inclusion in the distributed ledger. For example, the application 402 operating on the first node computing entity 200A may provide, submit, and/or the like the FSM record and/or message set to the framework layer 500 operating on the first node computing entity 200A. For example, the first node computing entity 200A may comprise a processing element 205 configured for executing the FSM rules encoded by computer-executable instructions and/or code (e.g., stored in memory 210, 215) for operating and/or executing the framework layer 500. The framework layer 500 may receive the FSM record and/or message set.

At 656, the framework layer 500 operating on the first node computing entity 200A may generate, create, and/or the like an FSM record block based on the FSM record and/or message set. For example, the framework layer 500 (e.g., provided by the execution of the computer-executable instructions and/or code encoding the FSM rules by the processing element 205 of the first node computing entity 200A) may generate, create, and/or the like the FSM record block based on the FSM record and/or message set. For example, generating, creating, and/or the like the FSM record block may comprise generating, creating, and/or the like the header for the FSM record block. For example, generating, creating, and/or the like the FSM record header may comprise generating, compiling, creating, and/or the like the FSM record list. In an example embodiment, generating, creating, and/or the like the header for an FSM record block may comprise generating a hash for one or more FSM records and/or messages of the FSM record and/or message set or the FSM record list.

At 658, the FSM record block may be provided for validation. In an example embodiment, the validation process uses a modified RAFT algorithm wherein baton-passing simulates a leader. For example, the first node computing entity 200A may provide (e.g., transmit for example via a communications interface 220) the FSM record block to at least one other node computing entity 200. For example, a second node computing entity 200B may receive (e.g., via a communications interface 220) the FSM record block. For example, the framework layer 500 of the second node computing entity 200B may receive the FSM record block. In an example embodiment, each node computing entity 200, 200' of the distributed ledger network 100 validates the FSM record block. In an example embodiment, only a single node (e.g., the first node computing entity 200A or a second node computing entity 200B) may validate the FSM record block. In an example embodiment, one or more second node computing entities 200B may be algorithmically selected to validate the FSM record block. In an example embodiment, the validation of the FSM record block may be asymmetric. For example, a second node computing entity 200B may validate a portion of the FSM record block (e.g., one or more fields, FSM record and/or messages, and/or the like of the FSM record block) and a third node computing entity 200C may validate an overlapping or non-overlapping portion of the FSM record block. For example, the second node computing entity 200B may validate FSM records and/or messages of the FSM record block corresponding to business transaction activities and the third node computing entity 200C may validate FSM records and/or messages of the FSM record block corresponding to user account administration, in an example embodiment.

At 660, the framework layer 500 operating on the second node computing entity 200B may pass at least a portion of the event information/data of the FSM record block to an application 402 operating on the second node computing entity 200B. For example, the framework layer 500 may execute one or more computer-executable instructions and/or code of the FSM rules to determine a validation protocol for the FSM record block and provide at least a portion of the event information/data of the FSM record block to the application 402 for validation.

At 662, the FSM record block may be validated. For example, the application 402 operating on the second node computing entity 200B may validate (or verify) the FSM record block and/or one or more fields of event information/data contained therein. In an example embodiment, the validation process ensures that the event information/data of one or more fields of the FSM record block are agreed to by at least two node computing entities (e.g., 200A, 200B) of the distributed ledger network 100. In an example embodiment, the validation process is performed by custom validation logic and/or FSM rules corresponding to the application 402. In an example embodiment, the validation logic and/or FSM rules are stored and/or embedded in the node computing entity 200, 200' (e.g., in memory 210, 215) and are used to ensure the proper domain object states are transitioned to in the correct sequence and that changes are only made to the correct domain objects. For example, the validation procedure may ensure that each domain object is in the appropriate state and has the appropriate properties as a result of the transitions corresponding to the events of the FSM record block. In an example embodiment, the framework layer 500 operating on the second computing entity 200B may operate the FSM rules to perform the validation process while communicating with the application 402 operating on the second node computing entity 200B via a callback to verify/validate the FSM record block. For example, 660, 662, and 664 may represent the callback validation of the FSM record block performed by the framework layer 500 of the second node computing entity 200B and the application 402 operating on the second node computing entity 200B.

At 666, a FSM record block validation message may be provided by the second node computing entity 200B. For example, the framework layer 500 operating on the second node computing entity 200B may determine that the FSM record block is validated and provide (e.g., transmit) a FSM record block validation message indicating the validation and/or verification of the FSM record block (e.g., via one or more networks 135, 135B). The first node computing entity 200A may receive the FSM record block validation message (e.g., via one or more networks 135, 135B).

At 668, the validation procedure is applied. For example, the framework layer 500 operating on the first node computing entity 200A may apply the validation procedure (e.g., by executing computer-executable instructions and/or code of the FSM rules). For example, the framework layer 500 operating on the first node computing entity 200A may determine if the appropriate number of node computing entities 200, 200' have validated the FSM record block. For example, the framework layer 500 may determine if the correct number of FSM record block validation messages have been received (e.g., via the communication interface 220). In an example embodiment, the framework layer 500 may determine if FSM record block validation messages have been received from the appropriate node computing entities 200, 200'. As should be understood, the validation procedure may be customized for various applications and applied through the execution of the FSM rules by the framework layer 500 of the first node computing entity 200A.

At 670, consensus is requested. For example, the framework layer 500 operating on the first node computing entity 200A may provide (e.g., transmit via the communication interface 200) a consensus request. In an example embodiment, consensus assures that an FSM record block is well-formed and that no other FSM record block with different data is competing for the same identity. In example embodiments, consensus may be achieved through quorum, voting, and/or the like. In an example embodiment, consensus may be asymmetric with customizable policy controls and support for pseudonymous authenticated participation. For example, an application 402 may require approval of an FSM record block from 60%, 70%, 75%, 80%, 85%, 90%, 95%, or 100% of the node computing entities 200, 200' of the distributed ledger network 100. In an example embodiment, an application 402 may require approval of an FSM record block from at least one node computing entity 200 from one or more groups of node computing entities 200, 200'. For example, in an example embodiment, the node computing entities 200, 200' of the distributed ledger network 100 are organized into divisions and consensus requires approval from at least one node computing entity 200, 200' from each division. In an example embodiment, consensus does not require the contents of the FSM record block to be re-propagated. For example, the previous providing and/or transmission of the FSM record block for the purposes of validation may be referenced in the consensus request. Thus, in an example embodiment, the consensus request may comprise a reference to a validation request and may not comprise the FSM record block itself. Therefore, example embodiments provide the improvement of reducing the amount of information/data that needs to be communicated across the distributed ledger network 100 to perform the validation and consensus procedures.

At 672, the framework layer 500 operating on the second node computing entity 200B may receive the consensus request and perform the consensus check. For example, the second node computing entity 200B may execute FSM rules to perform a consensus check of the FSM record block. In an example embodiment, the FSM rules (e.g., the computer-executable instructions and/or code) may check the FSM record block to ensure the FSM record block is well-formed and in accordance with the FSM rules. If the FSM record block is well-formed and in accordance with the FSM rules, the FSM record block passes the consensus check. At 674, the second node computing entity 200B (e.g., the framework layer 500 operating thereon) may provide a consensus vote. For example, the second node computing entity 200B may transmit a consensus vote via the communication interface 220. For example, if the FSM record block passes the consensus check the second node computing entity 200B may vote in favor of publishing and/or posting the FSM record block.

At 676, responsive to receiving the appropriate consensus votes, the first node computing entity 200A posts the FSM record block to the distributed ledger 604. The FSM record block may then be distributed via the distrubed ledger 604 to each of the node computing entities 200, 200' of the distrubted ledger network 100 at 678. At 680, the framework layer 500 of the second node computing entity 200B may notify the application 402 operating on the second node computing entity 200B of the posted FSM record block. At 682, responsive to posting the FSM record block to the distributed ledger 604 and/or responsive to receiving the appropriate consensus votes, the first node computing entity 200A may notify the application 402 operating thereon of the posted FSM record block. As indicated by the legend shown in FIG. 6, some of the messages may be synchronous messages and some of the messages may be asynchronous messages, in various embodiments.

In various scenarios, it may be determined, during the validation process that the framework layer 500 operating on the second node computing entity 200B cannot validate and/or verify that the correct state for one or more domain objects has been recorded in the FSM record and/or message of the FSM record block. For example, the FSM record block may indicate that inconsistent states have been traversed (e.g., a status of a domain object may change from state 1 to state 3 without passing through intermediate state 2) or that a property has been set incorrectly. If the second node computing entity 200B cannot validate and/or verify the states of one or more domain objects, the second node computing entity 200B communicates this failure back to the first node computing entity 200A. The application 402 operating on the first node computing entity 200A and corresponding to the non-validated FSM record, FSM message, and/or FSM record block may be notified and the appliation may apply its own specific exception handling logic to aid the framework layer 500 in resolving the validation and/or verification concerns.

In various scenarios, it may be determined, during the consensus check, that an error in the block structure is detected by the framework layer 500 operating on the second node computing entity 200B. For example, a hash mismatch may be detected or some other system error may be detected. The second node computing entity 200B may then vote against the publishing and/or posting the FSM record block. Responsive to receiving one or more votes against publishing and/or posting the FSM record block, the framework layer 500 operating on the first node computing entity 200A may notify the application 402 operating on the first node computing entity 200A that the block did not pass the consensus check and special handling logic may be used to resolve the detected errors (e.g., by the user manager 502 or FLM 506).

b. Snapshotting

FIG. 7A provides a schematic diagram of an example distributed ledger 700 comprising snapshots 720 (e.g., 720A, 720B, 720C, 720D). In an example embodiment, the ledger 700 is comprised of segments 705 (e.g., 705A, 705B). In an example embodiment, each segment 705 is stored in a segment data file such that a new segment is started when a current segment data file is closed and a new segment data file is initiated. Each segment 705 may comprise one or more blocks 710 (e.g., 710A, 710B, 710C, 710D). For example, the first segment 705A of the distributed ledger 700 comprises the genesis block 710A of the ledger 700 and blocks 710B and 710C. The second segment 705B comprises root block 710D of the second segment 705B. In various scenarios, the second segment 705B may comprise a plurality of blocks 710 in addition to root block 710D. In various scenarios, the ledger 700 may comprise a plurality of segments 705 each comprising a root block. Each of the plurality of segments 705 may further comprise one or more other blocks in addition to the segment root block. One or more of the blocks 710 may comprise a snapshot 720. In an example embodiment, a snapshot is a composite record of eligible domain objects and indicates the state of each of the eligible domain objects at the time the snap shot is generated. The eligible domain objects are determined from the set of system domain objects based on eligibility rules that may be application dependent. For example, a distributed ledger 700 may be an application activity ledger 604 corresponding to the application 402 and the eligibility rules that determine the eligible domain objects may be determined based on the application 402. Each application 402 may correspond to an application activity ledger 604 within the user directory activity ledger 602 and store information/data corresponding to events related to user accounts that are stored within the user activity ledger 602 and that occur within and/or relate to the application 402. For example, only domain objects relevant to the application 402 may be considered eligible domain objects, in an example embodiment. For example, only domain objects used to execute the application 402 or that may be modified by the execution of the application 402 may be considered eligible domain objects for the application 402.

FIG. 7B provides pseudocode of an example FSM record block of the common FSM record block structure 610' comprising a snapshot message 616. For example, the FSM records and/or messages of the FSM record block may comprise a snapshot message 616. The snapshot message 616 may be an FSM record of the type snapshot. The snapshot message 616 may comprise a plurality of record fields. In an example embodiment, the record fields may comprise an event field configured for identifying the record as a snapshot, one or more domain object fields identifying one or more domain objects and/or a current state corresponding to each of the identified domain objects, time and date fields for indicating the time and/or data that the snapshot was captured, and/or other fields comprising information/data. For example, the other fields may comprise a ledger identifier or id configured to identify the ledger. In an example embodiment, the ledger id is a global unique id for identifying the ledger. In an example embodiment, the other fields comprise a ledger instance identifier or id configured to identify the instance of the ledger corresponding to the snapshot, the date and time the snapshot message 616 was generated, captured, created, and/or the like, a snapshot sequence number indicating the position of the snapshot in an ordered set of snapshots for the distributed ledger, a list of domain objects and their corresponding states, an event counter for one or more domain objects, and/or the like.

FIG. 8 provides an illustrative conceptual example of a snapshot and a corresponding ledger event stream. For example, each box 805A-J corresponds to an event logged by an FSM record stored in a block of the distributed ledger corresponding to trade A123 and trade B456. The event of box 805J occurred before the event of box 805I, which occurred before the event of box 805H, and so on. The two boxes 810A, 810B provide the snapshot of the events corresponding to boxes 805A-J. In particular, the snapshot provided by boxes 810A and 810B summarizes the events of boxes 805A-J to provide the current state of the trades A123 and B456 at the time the snapshot was generated.

FIG. 9 provides a flowchart illustrating the process of generating, creating, and/or the like a snapshot, according to an example embodiment. Starting at 902, a snapshot request is received by the FLM 506 operating on the first node computing entity 200A. In an example embodiment, the snapshot request is an automated request generated by the framework layer 500 operating on the first node computing entity 200A in response to the FSM rules. For example, the FSM rules may indicate that a snapshot should be generated every 10 minutes, every hour, once a day, after every 20 events, after every 100 events, and/or the like. In another example, a user (e.g., operating a user computing entity 30) may provide input via a user interface of the user computing entity 30 requesting that a snapshot be generated. The user computing entity 30 may then provide (e.g., transmit) the snapshot request such that the first node computing entity 200A receives the snapshot request (e.g., via the communication interface 220, and/or the like). In an example embodiment, the snapshot corresponds to a particular application activity ledger 604 and the corresponding application 402.

At 904, the FLM 506 determines the eligible domain objects based on the FSM rules and/or the application 402 for which the snapshot is being generated, and requests the current state of the eligible domain objects from the state cache 404 of the application 402 operating on the first node computing entity 200A. In an example embodiment, the FLM 506 need not determine the eligible domain objects as the eligible domain objects are determined by the domain objects for which states are stored in the state cache 404. At 906, the FLM 506 receives the states for the eligible domain objects from the state cache 404. For example, 904 and 906 may correspond to the FLM 506 operating on the first node computing entity 200A issuing a get command to the state cache 404 of the application 402 operating on the first node computing entity 200A and receiving the response to the get command.

At 908, the FLM 506 operating on the first node computing entity 200A generates a new segment root block. In an example embodiment, a root block may be the first block 710 of a segment 705 of the distributed ledger 700. For example, the FLM 506 may generate root block for a new segment. At 910, the FLM 506 may pass and/or provide a command to the local file storage 606 of the first node computing entity 200A to close the current segment data file. Responsive to receiving the command, the local file storage 606 may close the current segment data file. At 912, the FLM 506 operating on the first node computing entity 200A may pass and/or provide a command to the local file storage 606 of the first node computing entity 200A to open a new segment data file in the local file storage. Responsive to receiving the command, the local file storage 606 may open a new segment data file (e.g., stored in the memory 210, 215). At 914, the FLM 506 operating on the first node computing entity 200A may pass and/or provide a command to the local file storage 606 to store the generated root block for the new segment in the new segment data file. Responsive to the receiving the command, the local file storage 606 may store the generated root block for the new segment in the new segment data file. At 916, the state cache 404 of the application 402 operating on the first node computing entity 200A is replaced by the domain object states of the new root block. For example, the creation of the new root block may cause the event counter of one or more domain objects to be incremented, and thereby give rise to new versions of the domain objects. Thus, the state cache 404 may be updated and/or replaced based on the domain object states of the new root block. For example, the processing element 205 of the first node computing entity 200A may cause the state cache 404 to be updated and/or replaced based on the domain object states of the new root block. As should be understood, in an example embodiment, a new segment need not be started each time a snapshot is captured and recorded to the application activity ledger 604.

At 918, the snapshot message block, which is an FSM record block comprising a snapshot message, is posted to the activity ledger (e.g., the application activity ledger 604 corresponding to the application 402). For example, the first node computing entity 200A may post and/or publish the snapshot message block to the activity ledger. For example, the first node computing entity 200A may request validation and consensus checks of the snapshot message block from one or more second and/or third node computing entities 200B, 200C as described above with respect to FIG. 6. The posting and/or publishing of the block to the activity ledger may be governed by the validation and consensus rules of the FSM rules of the framework level 500 (e.g., the FLM 506) executing on the first node computing entity 200A (e.g., via the processing element 205).

At 920, the FLM 506 executing on the second node computing entity 200B may receive the snapshot message via the distributed activity ledger (e.g., the application activity ledger 604 of the user directory activity ledger 602). For example, the communication interface 220 of the second node computing entity 200B may receive the snapshot message via the distributed activity ledger and pass and/or provide the snapshot message to the FLM 506 operating on the second node computing entity 200B.

At 922, the FLM 506 operating on the second node computing entity 200B may pass and/or provide a command to the local file storage 606 of the second node computing entity 200B to close the current segment data file. Responsive to receiving the command, the local file storage 606 may close the current segment data file. At 924, the FLM 506 operating on the second node computing entity 200B may pass and/or provide a command to the local file storage 606 of the second node computing entity 200B to open a new segment data file in the local file storage. Responsive to receiving the command, the local file storage 606 may open a new segment data file (e.g., stored in the memory 210, 215 of the second node computing entity 200B). At 926, the FLM 506 operating on the second node computing entity 200B may pass and/or provide a command to the local file storage 606 of the second node computing entity 200B to store the root block for the new segment in the new segment data file. Responsive to the receiving the command, the local file storage 606 may store the root block for the new segment in the new segment data file. At 928, the state cache 404 of the application 402 operating on the second node computing entity 200B is replaced by the domain object states of the new root block. For example, the creation of the new root block may cause the event counter of one or more domain objects to be incremented, and thereby give rise to new versions of the domain objects. Thus, the state cache 404 may be updated and/or replaced based on the domain object states of the new root block. For example, the processing element 205 of the second node computing entity 200B may cause the state cache 404 to be updated and/or replaced based on the domain object states of the new root block. As indicated by the legend shown in FIG. 9, some of the messages may be synchronous messages and some of the messages may be asynchronous messages.

c. Adding a New Node or Restarting a Node Using a Snapshot

In various embodiments, a snapshot may be used to restart a node computing entity 200, 200' or add a new node computing entity 200, 200' to the distributed ledger network 100 at a particular point in time (e.g., a point-in-time restart). According to traditional distributed ledgers or blockchains, the new or restarted node computing entity 200, 200' would need to iterate through all of the messages and/or records stored in the distributed ledger or blockchain so that the new or restarted node would be "up to speed" on the current status of the domain objects. However, such an adding or restarting process is costly in terms of processing time and memory storage for a well-established distributed ledger or blockchain (e.g., a distributed ledger or blockchain having a significant amount of data stored therein). For example, a distributed ledger or blockchain may store petabytes of information/data. Thus, various embodiments of the present invention provide memory and processing time efficient information lifecycle management. For example, the snapshotting process and the adding and/or restarting of nodes using a snapshot allows for a means to manage and control the large volume of data handled by the distributed ledger network 100 by partitioning activity and removing stale data, minimizing the consumption of local resources (memory and processing resources) and thereby improves the performance of the distributed ledger network 100 and system activities such as querying, indexing, and recovery.

FIG. 10 provides a flowchart illustrating the process of restarting a first node computing entity 200A using a snapshot. As should be understood, a similar procedure may be used to add a new node computing entity 200, 200' to the distributed ledger network 100. Starting at 1002, a node restart command is received. For example, the first node computing entity 200A may receive a node restart command. In an example embodiment, the node restart command may be received via the user interface of the first node computing entity 200A. In an example embodiment, the node restart command may be received by the communication interface 200 of the first node computing entity 200A, wherein the node restart command is provided by user input to a user interface of a user computing entity 30 and then provided by the user computing entity 30 to the first node computing entity 200A (or other node computing entity 200, 200' that may relay the restart node command to the first node computing entity 200A). In an example embodiment, the node restart command may be generated in response to the execution of FSM rules via the framework layer 500 by the first node computing entity 200A. For example, the FSM rules being executed by the first node computing entity 200A may indicate that the first node computing entity 200A should be restarted in response to detection of a triggering event. In an example embodiment, a triggering event may occur based on a clock (e.g., every 7 days, every 30 days, every 90 days, and/or the like). In an example embodiment, the triggering event may be detection of a fault, bad telemetry data, and/or the like. Thus, the FLM 506 operating on the first node computing entity 200A may receive a node restart command.

At 1004, responsive to receiving the node restart command, the FLM 506 may request the last or most recent segment data file. For example, a segment data file may be a data file storing a segment of the distributed ledger. In an example embodiment, each segment data file comprises at least one snapshot message. For example, as shown in FIG. 7A, one or more FSM record blocks 710 may comprise a snapshot message 720. For example, the FLM 506 operating on the first node computing entity 200A may request the last or most recent segment data file from the lcoal file storage 606 of the first node computing entity 200A. At 1006, the local file storage 606 of the first node computing entity 200A may provide the last or most recent segment data file to the FLM 506 operating on the first node computing entity 200A. For example, 1004 and 1006 may represent a get command for the last or most recent segment data file issued by the FLM 506 to the local file storage 606 and the local file storage 606 providing the last or most recent segment data file responsive to the get command.

At 1008, the FLM 506 of the first node computing entity 200A reads the last or most recent segment data file starting at the root block. For example, if the last or most recent segment data file comprises the second segment 705B, the FLM 506 would read the root block 710D and any subsequent blocks 710 of the segment. At 1010, the FLM 506 operating on the first node computing entity 200A may request any FSM records and/or messages or FSM record blocks that have been posted and/or published to the distributed ledger since the last FSM record and/or block or FSM record block was written to the last or most recent segment data file from the second node computing entity 200B. For example, the FLM 506 of the first node computing entity 200A may cause the communication interface 200 of the first node computing entity 200A to transmit a request for missing FSM records and/or messages or FSM record blocks to the second node computing entity 200B. For example, the request for missing FSM records and/or messages or FSM record blocks may comprise date and/or time the last FSM record and/or message or FSM record block was written in the last or most recent segment data file by the first node computing entity 200A, a record, message, and/or block identifier identifying the last FSM record and/or message or FSM record block that was written in the last or most recent segment data file by the first node computing entity 200A, and/or the like. At 1012, the second node computing entity 200B may receive the request for missing FSM records and/or messages or FSM record blocks (e.g., via the communication interface thereof). Responsive to receiving the request, the FLM 506 operating on the second node computing entity 200B may identify any FSM records and/or messages or FSM record blocks that have been written to the segment data file in question and/or published and/or posted to the distributed ledger that are not present in the last or most recent segment data file of the first node computing entity 200A. For example, based on the date and/or time and/or the record, message, and/or block identifier provided in the request, the FLM 506 may identify the FSM records and/or messages or FSM record blocks missing from the last or most recent segment data file of the first node computing entity 200A and provide (e.g., transmit) the missing FSM records and/or messages or FSM record blocks to the first node computing entity 200A.

The FLM 506 operating on the first node computing entity 200A may then receive the missing FSM records and/or messages or FSM record blocks and, responsive thereto, write the received missing FSM records and/or messages or FSM record blocks to the open segment data file (e.g., the last or most recent segment data file), at 1014. At 1016, the FLM 506 of the first node computing entity 200A updates and/or replaces the state cache 404 of the application 402 operating on the first node computing entity 200A based on the snapshot and any received missing FSM records and/or messages or FSM record blocks. Thus, the first node computing entity 200A need only to read the last or most recent segment data file and any missing FSM records and/or messages or FSM record blocks (e.g., any FSM records and/or messags or FSM record blocks written, posted, and/or published to the distributed ledger since the final entry in the last or most recent segment data file of the first node computing entity 200A). In particular, the first node computing entity 200A need not read the entire distributed ledger at ever restart or when the first node computing entity 200A is added to the distributed ledger network 100.

Thus, various embodiments provide advantages in the technical fields of distributed ledger networks, distributed ledger management, and information lifetime management. For example, a node computing entity 200, 200' of the distributed ledger network 100 may be restarted at a point-in-time and use the most recent snapshot stored in the distributed ledger to quickly and efficiently determine the current state of one or more domain objects. Similarly, a new node computing entity 200, 200' may be added to the distributed ledger network 100 and use the most recent snapshot stored in the distributed ledger to quickly and efficiently determine the current state of one or more domain objects. Thus, restarting a node computing entity 200, 200' of the distributed ledger network 100 and adding of a node computing entity 200, 200' of the distributed ledger network 100 does not require the restarted or new node computing entity 200, 200' to process through the entire distributed ledger from the genesis block of the ledger. As previoulsy noted, the distributed ledger may comprise petabytes of information/data. Therefore, processing the entire distributed ledger is costly in time and processing resources.

d. User Account Management

In example embodiments, the distributed ledger may be used to manage user accounts. For example, user accounts may be created, generated, and/or the like by a user manager 502 operating in the framework layer 500 of the node computing entity 200, 200'. In an example embodiment, access to various information/data stored in an FSM record block, FSM record and/or message, and/or a field thereof may be granted and/or provided to a user account by providing a user with a data access key via the distributed ledger. Additionally, according to an example embodiment, information/data provided as part of an FSM record and/or message and/or the FSM record and/or message itself may be authenticated via the signing of the information/data and/or the FSM record and/or message with a user authentication key. For example, the user directory activity ledger 602 managed by the user directory manager 504 may function as a user account and data access management tool. In an example embodiments, one or more user accounts may correspond to human users such as administrators or operators. In an example embodiment, one or more user accounts may correspond to system components, upon whom the operation of the digital ledger network 100 is dependent (e.g., for validation and/or consensus, observers, a node computing entity FLM 506, a node computing entity user account manager 502, and/or the like). In an example embodiment, one or more user accounts may correspond to external applications, such as an order gateway, order management system, and/or the like.

FIG. 11A provides a table of some example data structures that may be used to manage user accounts via the distributed ledger (e.g., the user directory activity ledger 602). For example, the user information/data may comprise a user identifier or ID, a user name, a group corresponding to the user, a data signing/authentication key pair (e.g., a private and public DSA key), one or more data access (encryption/decryption) keys (e.g., a private and public DHM key). In an example embodiment, the user ID may be a globally unique identifier used to identify the user account. The user name may be the name of a person, system component, external application, and/or other user corresponding to the user account. In an example embodiment, the user information/data for a user account may comprise one or more groups. In an example embodiment, the groups corresponding to the user account correspond to data grants and/or permissions provided to the user account. The data authentication key pair may comprise a private key used to sign information/data and/or FSM records and/or messages generated by and/or in correspondence with the user account and a public key used to authenticate the signer of information/data and/or an FSM record and/or message. In another example, the key information/data may comprise a key identifier or ID, a key name, and a key value. For example, the key ID may be a globally unique identifier used to identify the key. The key name may provide a name for the key. For example, one key may have the key name Joe Ventura private signature key. Another key may have the name security level three access public key, for example. The key value may be value of the key itself used to encrypt/decrypt and/or to sign/authenticate information/data, an FSM record and/or message, and/or an FSM record block.

In an example embodiment, the local wallet 608 of a first node computing entity 200A stores information about user accounts and their associated public keys that have been shared across the distributed ledger network 100 via the user directory activity ledger 602. The local wallet 608 of a first node computing entity 200A also stores user information/data for user accounts created directly with the user directory manager 504 of the first node computing entity 200A or that have been imported from the local wallet of another node computing entity 200, 200' or that have been imported from a smart card along with the public and private keys corresponding, associated, and/or available to those user accounts. In an example embodiment, the user information/data and key information/data may also be stored in a local wallet 608 of one or more node computing entities for which the user information/data and/or key information/data is relevant. For example, one user account my corresponding to application 402 operating on the first node computing entity 200A. The user information/data and the key information/data for keys corresponding to the user account may be stored in the local wallet 608 of the first node computing entity 200A. For example, the local wallet of the first node computing entity 200A may comprise user information/data and the corresponding key information/data for user accounts that were generated via the user manager 502 of the first node computing entity 200A or that have been imported from the local wallet of another node computing entity 200, 200' or from a smart card.

FIG. 11B provides a table summarizing various keys used to sign, authenticate, encrypt, and/or decrypt FSM record blocks and/or portions thereof. For example, a user account may be associated with a signing key may be private key used by a user account to sign an FSM record block and/or a portion thereof. In an example embodiment, a signing key may be a private DSA key. In another example, a user account may be associated with an authentication key used to authentication FSM blocks and/or portions thereof signed by the user account. In an example embodiment, an authentication key may be a public DSA key. In an example embodiment, the signing key and the authentication key are asymmetric keys with respect to one another. In an example embodiment, a user account may be associated with and/or have access to an encryption key used to encrypt information/data that is accessible to the user account. For example, the user account may have access to a decryption key for decrypting information/data encrypted using the encryption key. In an example embodiment, the encryption code is a public DHM key. In an example embodiment, the user account may be associated with and/or have access to a decryption key for decrypting information/data encrypted using the encryption key. For example, the decryption key may be a private DHM key. In an example embodiment, the encryption key and the decryption key are symmetric keys with respect to one another.

In an example embodiment, each user may have an encryption/decryption key pair associated therewith. Other DAKs may be shared with the user account functionally providing the user account with permission to access any information/data stored in the distributed ledger (e.g., the user activity directory ledger 602) encrypted and/or protected via the DAK.

FIG. 12 is a schematic diagram illustrating how a user directory manager 504 provides access to information/data stored in the user directory account ledger 604 in accordance with an example embodiment. For example, the block 710 may be authenticated by the user directory manager 504 using the authentication key for the user account that signed the block 710. It may then be determined if the user account has permission to access the block 710. For example, the block 710 may be decrypted using a decryption key accessible to the user account. Next, user directory manager 504 may authenticate the record/message 730 of the block 710 using the authentication key for the user account that signed the record/message 730. The user directory manager 504 may then determine if the user account has permission to access the record/message 730. For example, the record/message 730 may be decrypted using a decryption key accessible to the user account. Finally, user directory manager 504 may authenticate the field 735 of interest of the record/message 730 using the authentication key for the user account that signed the field 735. The user directory manager 504 may then determine if the user account has permission to access the field 735. For example, the field 735 may be decrypted using a decryption key accessible to the user account. Thus, according to an example embodiment, at each step of accessing information/data from one or more fields of an FSM record and/or message and/or FSM record block, an authentication key may be used to authenticate the user account that signed the information/data, FSM record and/or message, and/or FSM record block. The permissioning of access to the data may be controlled at each step via the encrypting of the information/data, FSM record and/or message, and/or FSM record block using an encryption key that corresponds to a decryption key accessible to the intended recipients and/or user accounts that it is desired to have access the information/data.

FIG. 13 provides pseudocode of an example FSM block of the common FSM record block structure 610" comprising one or more user management messages. For example, a user management message may be an add/edit message 612 for adding and/or editing a user account, a share key 614 message for sharing and/or providing a key with a user account, and/or the like. For example, posting and/or publishing the FSM record block shown in FIG. 13 will create a user account in user activity directory ledger 602 in accordance with the add/edit user message 612 and will share a key with one or more user accounts in accordance with the share key message 614. In an example embodiment, an add/edit user message 612 may comprise user information/data such as a user id and/or other user information/data and one or more commands corresponding to the user information/data. For example, the user information/data (e.g., as shown in FIG. 11A) may be provided for a new user account along with a command to create the new user account. In another example, the user name of an existing user account may be changed by providing the user id for the existing user account, a new user name for the existing user account, and a command to update the user information/data of the user account accordingly. In an example embodiment, share key message 614 may comprise a receiving user id identifying the receiver of the key being shared, a key type (e.g., symmetric key, asymmetric key), the encrypted key, and/or the like. For example, the encrypted key may be the key being shared encrypted using a key for which the user account identified by the receiving user id has access to. In an example embodiment, each field of the message in the FSM record block may be signed by the user account that is creating the new user account, editing the user account, or sharing the key.

FIG. 14 provides a flowchart illustrating the process of creating a new user account within the user activity directory ledger 602, according to an example embodiment. As should be understood, editing an existing user account may be performed via a similar procedure, in an example embodiment. Starting at 1402, a create user request is received. For example, the user interface of the first node computing entity 200A may receive user input providing a create user request. In another example embodiment, the user interface of a user computing entity 30 may receive user input providing a create user request and provide (e.g., transmit) the create user request to the first node computing entity 200A. In an example embodiment, the create user request may comprise a user name, group, and/or other information/data corresponding to the user. In an example embodiment, the create user request is generated via a user account having user account creation capabilities. As should be understood, in various embodiments, a create user request may be automatically generated by a user account that is not associated with a human user (e.g., by a user account corresponding to a system component or an external application).

At 1404, the create user request is passed to the user directory manager 504 of the first node computing entity 200A. For example, the user directory manager 504 operating on the first node computing entity 200A may receive the create user request. At 1406, the user directory manager 504 generates, creates, and/or the like the user information/data. For example, based at least in part on the create user request and responsive to receiving the create user request, the user directory manager 504 generates, creates, and/or the like the user information/data. For example, the user id may be generated using a global unique identifier algorithm, database, service, and/or the like.

At 1408, a signing/authentication key pair is generated for the new user account. For example, the user directory manager 504 operating on the first node computing entity 200A may generate a signing key and a corresponding authentication key for the user account. For example, the signing key may be a private DSA key and the corresponding authentication key may be a corresponding public DSA key, in an example embodiment. At 1410, an encrypting/decrypting key pair is generated for the new user account. For example, the user directory manager 504 operating on the first node computing entity 200A may generate an encrypting key and a corresponding decrypting key for the user account. For example, the encrypting key may be a public DHM key and the decrypting key may a corresponding private DHM key, in an example embodiment. At 1412, the private keys (e.g., the signing key and the decryption key) are stored in the local wallet 608 of the first node computing entity 200A. For example, the user directory manager 504 operating on the first node computing entity 200A may cause the private keys (e.g., the signing key and the decryption key) to be stored in the local wallet 608 of the first node computing entity 200A.

At 1414, the add/edit user message is generated. For example, the user directory manager 504 operating on the first node computing entity 200A may generate an add/edit user message for creating the user account in the user activity directory ledger 602. In an example embodiment, the add/edit user message and/or one or more fields thereof may be signed using the signing key of corresponding to the user account corresponding to the user directory manager 504 and/or the signing key of the user account from which the create user request originated.

At 1416, the add/edit user message and/or an FSM record block comprising the add/edit user message is posted and/or published to the distributed ledger (e.g., the user activity directory ledger 602). For example, the user directory manager 504 and/or FLM 506 operating on the first node computing entity 200A may perform a validation and/or consensus procedure to post and/or publish the add/edit user message and/or an FSM record block comprising the add/edit user message to the user activity directory ledger 602. For example, the user directory manager 504 and/or FLM 506 may perform a posting and/or publishing procedure similar to that described with respect to FIG. 6 to post and/or publish the add/edit user message and/or an FSM record block comprising the add/edit user message to the user activity directory ledger 602.

At 1418, the user directory manager 504 operating on the second node computing entity 200B receives the add/edit user message (e.g., via the communication interface 220 of the second node computing entity 200B) from the user activity directory ledger 602. At 1420, the user directory manager 504 operating on the second node computing entity 200B processes the add/edit user message. At 1422, the user that signed the add/edit user message may be identified and looked up via the local wallet 608 stored by the second node computing entity 200B. At 1424, the authentication key for the user that signed the add/edit user message is provided by the local wallet 608 of the second node computing entity 200B to the user directory manager 504. For example, 1422 and 1424 may represent the user directory manager 504 operating on the second node computing entity 200B issuing a get command for the authentication key corresponding to the user account that signed the add/edit user message. At 1426, the authentication key corresponding to the user account that signed the add/edit user message is used to authenticate the add/edit user message. For example, the user directory manager 504 operating on the second node computing entity 200B may use the authentication key corresponding to the user account that signed the add/edit user message to authenticate that the add/edit user message was generated and/or provided by the user account identified as signing the add/edit user message. At 1428, the user directory manager 504 operating on the second node computing entity 200B may update the local wallet 608 on the second node computing entity 200B with the new user account information/data and the corresponding keys, as appropriate.

FIG. 15 provides a flowchart illustrating the process of generating a new DAK key pair and the new DAK key to a user account within the user activity directory ledger 602, according to an example embodiment. Starting at 1502, a new/share key request is received. For example, the user interface of the first node computing entity 200A may receive user input providing a new/share key request. In another example, a user interface of a user computing entity 30 may receive user input providing a new/share key request and provide (e.g., transmit) the new/share key request to the first node computing entity 200A. In an example embodiment, the new/share key request may comprise a recipient user name or user ID, a key ID for an existing DAK to be shared, and may further comprise other information/data corresponding to the user account to which the DAK is to be provided and/or corresponding to the DAK to be generated. In an example embodiment, the new/share key request is generated via a user account having key creation and/or sharing capabilities. As should be understood, in various embodiments, a new/share key request may be automatically generated by a user account that is not associated with a human user (e.g., by a user account corresponding to a system component or an external application). The new/share key request is passed to the user directory manager 504 of the first node computing entity 200A. For example, the user directory manager 504 operating on the first node computing entity 200A may receive the new/share key request.

At 1504, the user directory manager 504 operating on the first node computing entity 200A may generate the new key in accordance with the new/share key request. For example, the user directory manager 504 may generate a symmetric DAK key pair in accordance with the new/share key request. In an example embodiment, a private DAK corresponding to an existing public DAK may be generated. In an example embodiment, the private DAK and the existing public DAK may be symmetric with respect to one another. At 1506, the new key pair and/or the private DAK may be encrypted using the public encryption key for the user account identified in the new/share key request as the recipient of the new and/or shared DAK. For example the user directory manager 504 operating on the first node computing entity 200A may encrypt the new key pair and/or the private DAK using the encryption key for the user account identified in the new/share key request as the recipient of the new and/or shared DAK. At 1508, a share key message is generated and signed using the authorizing user account's signing key. For example the user directory manager 504 operating on the first node computing entity 200A may generate a share key message and sign the share key message using the authorizing user account's signing key. In an example embodiment, the authorizing user account is the user account that submitted the new/share key request.

At 1510, the share key message and/or an FSM block comprising the share key message is published and/or posted to the distributed ledger (e.g., the user activity directory ledger 602). For example, the user directory manager 504 and/or FLM 506 operating on the first node computing entity 200A may perform a validation and/or consensus procedure to post and/or publish the share key message and/or an FSM record block comprising the share key message to the user activity directory ledger 602. For example, the user directory manager 504 and/or FLM 506 may perform a posting and/or publishing procedure similar to that described with respect to FIG. 6 to post and/or publish the share key message and/or an FSM record block comprising the share key message to the user activity directory ledger 602.

At 1512, the user directory manager 504 operating on the second node computing entity 200B receives the share key message (e.g., via the communication interface 220 of the second node computing entity 200B) from the user activity directory ledger 602. At 1514, the user directory manager 504 operating on the second node computing entity 200B processes the share key message. At 1516, the user that signed the add/edit user message may be identified based on the share key message and looked up via the local wallet 608 stored by the second node computing entity 200B. Additionally, the recipient user account may be identified based on the share key message and the decryption key for the recipient user account may be requested from the local wallet 608. At 1518, the authentication key for the user that signed the share key message and the decryption key for the recipient user account are provided by the local wallet 608 of the second node computing entity 200B to the user directory manager 504 operating on the second computing entity 200B. For example, 1516 and 1518 may represent the user directory manager 504 operating on the second node computing entity 200B issuing a get command for the authentication key corresponding to the user account that signed the share key message and a get command for the decryption key for the recipient user account. At 1520, the authentication key corresponding to the user account that signed the share key message is used to authenticate the share key message. For example, the user directory manager 504 operating on the second node computing entity 200B may use the authentication key corresponding to the user account that signed the share key message to authenticate that the share key message was generated and/or provided by the user account identified as signing the share key message.

At 1522, the user directory manager 504 operating on the second node computing entity 200B may decrypt the share key message using the decryption key for the recipient user account. At 1524, user manager 502 operating on the second node computing entity 200B stores the new DAK. At 1526, the user manager 502 operating on the second node computing entity 200B adds the new DAK to the DAK store of the local wallet 608. For example, the DAK store of the local wallet 608 may be updated to include the new DAK.

Various embodiments of the present invention provide various advantages with respect to user account management. For example, to grant access to a user account to existing information/data the appropriate DAKs need only to be shared, which provides retroactive access to all data associated with shared DAKs. In another example, new information/data elements may be permissioned differently than existing data elements through the creation and sharing of new DAKs. In another example, grants to previously written information/data cannot be revoked as the granting of the access and the information/data are both written to the immutable distributed ledger.

e. Immediate Order Book Failover

Example embodiments provide a mechanism for order book replication that enables immediate failover from a primary order book to a secondary order book. In particular, the failover from the primary order book to the secondary order book does not require a recreation of the secondary order book by iterating through the events stored in the distributed ledger from the start of processing. In an example embodiment, a FSM activity ledger comprising FSM record blocks for recording events, event information/data, and transformations to domain objects caused by the events and based on FSM rules that are executed by node computing entities 200, 200' to provide the framework layer of the 500.

FIG. 16 illustrates an example immediate failover system 1600 that provides an immediate failover from a primary order book to a secondary order book. The immediate failover system 1600 comprises a user computing entity 30 executing an order gateway 1602 and an order management system 1604. In an example embodiment, the order gateway 1602 and/or the order management system 1604 may operate on the first node computing entity 200A or another node computing entity 200, 200'. The immediate failover system 1600 further comprises one or more node computing entities 200, 200' of a distributed ledger network 100. For example, a primary order matching engine 1642A may operate on the application layer 400 of a first node computing entity 200A. The primary order matching engine 1642A may comprise a primary order book 1644A that operates as the state cache 404 and/or as a portin of the state cache 404 of the order matching engine application 402 operating on the first node computing entity 200A. Events processed by the order matching engine 1642A are recorded in the primary ledger file 1664A in the user activity directory ledger 602 of the protocol layer 600 operating on the first node computing entity 200A. The primary replication agent 1656A operates in the framework layer 500 operating on the first node computing entity 200A. The immedate failover system 1600 further comprises a second node computing entity 200B. A secondary replication agent 1656B operates on the framework layer 500 operating on the secondary computing entity 200B and receives event information/data from the primary replication agent 1656A (e.g., via a network 135). A secondary ledger file 1664B is stored in the user activity directory ledger 602 of the protocol layer 600 operating on the second node computing entity 200B. A secondary matching engine 1642B operates on the application layer 400 operating on the second node computing entity 200B. The secondary order matching engine 1642B may comprise a secondary order book 1644B that operates as the state cache 404 and/or as part of the state cache 404 of the order matching engine application 402 (e.g., the secondary order matchign engine 1642B) operating on the second node computing entity 200B. In an example embodiment, the immediate failover system 1600 further comprises a failover controller 1606 operating on the user computing entity 30 and/or one or more node computing entities 200, 200'.

In an example embodiment, the order gateway 1602 receives order instructions. For example, the order intructions may be received via a network interface and/or communication interface of the user computing entity 30. In an example embodiment, the order instructions are received via a well-defined protocol (e.g., FIX, REST, Web Socket, and/or/the like). The order gateway 1602 may be configured to perform basic syntactic validation of the order instructions, authenticate the order originator, and transform the order instructions and/or at least a portion thereof into an order message comprising order instructions and having an encrypted common internal message fromat. The order gateway 1602 then provides the order message to the order management system 1604. In an exmaple embodiment, the order gateway 1602 provides an event stream comprising a stream of order messages to the order management system 1604 as a binary event stream. In an example embodiment, the order gateway 1602 may further be configured to receive execution reports, rejection, and/or the like from the order management system 1604.

In an example embodiment, the order management system 1604 is configured to receive the order messages comprising order instructions from the order gateway 1602. The order management system 1604 transforms the stream of order messages comprising the order instructions into an encrypted stream of order originator directives. The order management system 1604 may further implement order controls and session checks such as checking the account status, authorization to trade, size limits and/or the like of one or more user accounts and/or orders corresponding to the order instructions. In an example embodiment, the order management system 1604 provides an event stream comprising a stream of order originator directives to the primary matching engine 1642A as a binary event stream. In an example embodiment, the stream of order originator directives are provided to the primary matching engine 1642A via one or more networks 135.

The primary matching engine 1642A receives the stream of order originator directives. In an example embodiment, the primary matching engine 1642A is configured to match orders from the primary order book 1644A according to a matching model. For example, the matching model may take into account price, time priorities, and/or the like. For example, the primary matching engine 1642A may match messages in the stream of order originator directives to existing orders (e.g., to update the order status), match offerings to purchases, identify new orders for which order information/data does not yet exist in the primary order book 1664A, and/or the like. The primary order book 1664A comprises a memory representation of the current state of all orders, specific to the requirements of the matching model. For example, the primary order book 1664A is the state cache 404 and/or a portion thereof of the primary matching engine 1642A application 402. The primary matching engine 1642A provides an outbound event stream that comprises both order originator directives and resulting actions. For example, the outbound event stream may comprise event information/data corresponding to an order related event and the resulting status of a corresponding order and/or other domain objects affected by the event. The outbound event stream provided by the primary matching engine 1642A comprises fully formed, digitally signed, and encrypted FSM records and/or messages and/or FSM record blocks, according to an example embodiment. The FSM records and/or messages and/or FSM record blocks of the event stream provided by the primary matching engine 1642A are written to the primary ledger file 1664A. In an example embodiment, the primary ledger file 1664A is a binary ledger file. In an example embodiment, the primary ledger file 1664A is the physical persistence and distribution mechanism for the FSM record blocks output by the primary matching engine 1642A. For example, the FSM record blocks written to the primary ledger file 1664A may comprise event information/data corresponding to orders and the resulting domain object states and be posted and/or published to a distributed ledger (e.g., via the primary ledger file 1664A) using a validation and consensus process and/or procedure. In an example embodiment, the primary ledger file 1664A may be used to recover state information/data for one or more orders (e.g., domain objects) in the event of a failure.

In an example embodiment, the primary replication agent 1656A operating on the first node computing entity 200A reads the FSM record blocks from the primary ledger file 1664A and provides, communicates, and/or transmits the FSM record blocks from the primary ledger file 1664A across one or more networks 135, 135B to a secondary replication agent 1656B operating on a second node computing entity 200B. In an example embodiment, the secondary replication agent 1656B operates in the framework layer 500 of the second node computing entity 200B to receive the FSM record blocks. The secondary replication agent 1656B writes the received FSM record blocks to a secondary ledger file 1664B via the protocol layer 600 of the second node computing entity 200B. In an example embodiment, the secondary ledger file 1664B is a binary ledger file.

In an example embodiment, the secondary matching engine 1642B is in a continuous standby recovery mode. In an example embodiment, the secondary matching engine is configured to read FSM record blocks from the secondary ledger file 1664B to update the secondary order book 1644B based thereon. For example, the secondary matching engine 1642B is in constant recovery mode such that the secondary order book 1644B is up-to-date and should generally reflect a current status of one or more order (e.g., domain objects) that align with the primary order book with a small latency due to the communication and processing delay due to the process of providing the FSM record blocks to the secondary matching engine 1642B via the secondary ledger file 1664B, secondary replication agent 1656B, primary replication agent 1656A, and primary ledger file 1664A.

In an example embodiment, the failover controller 1606 is a component of a set of operational controls operating on the distributed ledger network 100. The failover controller is a general purpose mechanism used system-wide, according to an example embodiment. In an example embodiment, the failover controller 1606 receives telemetry data from one or more node computing entities 200, 200'. In an example embodiment, telemetry is an automated communications process by which measurements and other data are collected and transmitted to the failover controller 1606 (or other operational controllers) for monitoring the activities and operation of one or more node computing entities 200, 200'. In an example embodiment, if the failover controller 1606 receives telemetry data indicating an issue or possible issue with the first node computing entity 200A (e.g., the first node computing entity 200A needs to be restarted, is overheating, is experiencing a failure), the failover controller 1606 may issue and/or provide (a) a directive to the first node computing entity 200A to stop processing the event stream provided by the order management system 1604, (b) a directive to the second node computing entity 200B to take over as the primary such that the secondary order book 1644B becomes the primary order book, and/or (c) a directive to a third computing entity 200C to take over as the secondary such that a new secondary order book is generated, updated, and/or stored by the third computing entity 200C. In an example embodiment, the failover controller 1606 is configured to manage failover profiles comprising failover information/data related to one or more failovers, and may function automatically or with human oversight.

FIG. 17 provides a flowchart illustrating the functioning of the immediate failover system 1606 and the reaction of the immediate failover system 1606 to a failover. Starting at 1702, the primary matching engine 1642A streams FSM record blocks comprising event information/data corresponding to one or more orders (e.g., order instructions, order originator directives, resulting actions, and/or the like). For example, the primary matching engine 1642A may be an application 402 operating in the application layer 400 of the first node computing entity 400. The primary matching engine 1642A may receive a stream of order messages, order originator directives, and/or the like from the order management system 1604. The primary matching engine 1642A may generate one or more FSM record blocks comprising event information/data corresponding to one or more orders based on the received stream. In an example embodiment, the primary matching engine 1642A may update an order book 1644A which is a state cache 404 (and/or a portion thereof) of the matching engine 1642A application 402 based on the stream of order messages, order directives, and/or the like. The FSM record blocks may then be streamed to the primary ledger file 1664A. For example, the FSM record blocks may be in a common block format 610 and may be stored in the primary ledger file 1664A. For example the primary ledger file 1664A may be stored in the memory 210, 215 of the first node computing entity 200A.

At 1704, a primary replication agent 1656A may read the FSM record blocks from the primary ledger file 1664A. For example, the primary replication agent 1656A may be an FLM 506 operating in the framework layer 500 of the first node computing entity 200A. The primary replication agent 1656A may issue a read command to the primary ledger file 1664A and receive the FSM record blocks indicated in the read command (e.g., any new blocks written to the primary ledger file 1664A since the primary replication agent 1656A last issued a read command to the primary ledger file 1664A). The primary replication agent 1656A may provide, transmit, pass, stream, and/or the like the read FSM record blocks from the primary ledger file 1664A to the secondary replication agent 1656B. The secondary replication agent 1656B operates in the framework layer 500 of the second node computing entity 200B. The secondary replication agent 1656B may receive the FSM record blocks provided by the primary replication agent 1656A (e.g., via a communication interface 220 and one or more networks 135). In an example embodiment, the secondary replication agent 1656B may then write the received FSM record blocks to the secondary ledger file 1664B at 1708.

At 1710, the secondary matching engine 1642B issues a read command to read the FSM record blocks recorded in the secondary ledger file 1664B. For example, the secondary matching engine 1642B may request and receive one or more FSM record blocks and/or a stream of FSM record blocks and process the one or more FSM record blocks. For example, the secondary matching engine 1642B may update the secondary order book 1644B based on the stream of FSM record blocks read from the secondary ledger file 1664B. For example, the secondary order book 1644B may include an indication of the state of the one or more orders. In an example embodiment, the order states indicated by the secondary order book 1644B may be similar to the order states indicated by the primary order book 1644A. For example, the order states indicated by the secondary order book 1644B are the same as the order states indicated by the primary order book 1644A other than a small processing delay due to processes 1702-1710.

At 1712, the failover controller 1606 receives a bad telemetry notification. For example, one or more sensors monitoring the first node computing entity 200A may detect a fault condition, a need for the first node computing entity 200A to restart, and/or the like. The first node computing entity 200A or another computing entity in communication with the one or more sensors may provide the bad telemetry notification to the failover controller 1606. In an example embodiment, the sensor data captured by the one or more sensors may be provided to the failover controller 1606 and the failover controller 1606 may determine that a fault condition is being/was experienced by the first node computing entity 200A, a need for the first node computing entity 200A, and/or the like has been detected. In response to receiving the bad telemetry notification and/or determining that a fault condition is being/was experienced by the first node computing entity 200A, a need for the first node computing entity 200A to be restarted, and/or the like has been detected, the failover controller provides a stop processing directive to the first node computing entity 200A at 1714 and a change to primary directive to the second node computing entity 200B at 1716.

Responsive to receiving the stop processing directive, the first node computing entity 200A stops processing the event stream provided by the order management system 1604. For example, the first matching engine 1642A stops processing the event stream provided by the order management system 1604. In an example embodiment, the primary matching engine 1642A may finish generating and providing FSM record blocks to be written in the primary ledger file 1664A for the events that the primary matching engine 1642A had processed prior to receiving the stop processing directive. Similarly, in an example embodiment, the primary replication agent 1656A may finish streaming each of the FSM record blocks written in the primary ledger file 1664A to the secondary replication agent 1656B. Responsive to receiving the change to primary directive, the second node computing entity 200B starts processing the event stream provided by the order management system 1604. For example, the secondary matching engine 1642B starts processing the event stream provided by the order management system 1604. In an example embodiment, the second matching engine 1642B finishes processing all of the FSM record blocks written to the primary ledger file 1664A on the first node computing entity 200A and provided to the secondary replication agent 1656B before beginning to process the event stream provided by the order management system 1604. Thus, the secondary order book 1644B of the second node computing entity 200B takes over as the primary order book. In particular, the secondary order book 1644B on the second node computing entity 200B takes over the primary order book immediately without needing to conduct a recovery operation as the secondary order book 1644B already includes real time or near real time up-to-date order states for the orders of the primary order book 1644A. At 1716, the failover controller 1606 provides a change to secondary directive to the third node computing entity 200C. For example, the replication agent 1656B operating on the second node computing entity 200B starts streaming the FSM record blocks written to and/or read from the now primary ledger file 1664B to the replication agent 1656C operating on the third node computing entity 200C.

At 1718, the now primary matching engine 1642B operating on the application layer 400 of the second node computing entity 200B processes the event stream provided by the order management system 1604 and streams FSM record blocks comprising event information/data corresponding to one or more orders (e.g., order instructions, order originator directives, resulting actions and/or order states, and/or the like). The now primary matching engine 1642B operating on the second node computing entity 200B may receive a stream of order messages, order originator directives, and/or the like from the order management system 1604. The now primary matching engine 1642B may generate one or more FSM record blocks comprising event information/data corresponding to one or more orders based on the received stream. In an example embodiment, the primary matching engine 1642B may update an order book 1644B which is a state cache 404 of the matching engine application 402 based on the stream of order messages, order directives, and/or the like. The FSM record blocks may then be streamed to the now primary ledger file 1664B stored in the memory 210, 215 of the second computing entity 200B. For example, the FSM record blocks may be in a common block format 610 and may be stored in the now primary ledger file 1664B.

At 1720, the now primary replication agent 1656B operating on the second node computing entity 200B may read the FSM record blocks from the now primary ledger file 1664B stored by the second node computing entity 200B. The now primary replication agent 1656B may issue a read command to the now primary ledger file 1664B and receive the FSM record blocks indicated in the read command (e.g., any new blocks written to the primary ledger file 1664B since the primary replication agent 1656B last issued a read command to the primary ledger file 1664B). The primary replication agent 1656B may provide, transmit, pass, stream, and/or the like the read FSM record blocks from the primary ledger file 1664B to the now secondary replication agent 1656C. The now secondary replication agent 1656C operates in the framework layer 500 of the third node computing entity 200C. The secondary replication agent 1656C may receive the FSM record blocks provided by the primary replication agent 1656B (e.g., via a communication interface 220 and one or more networks 135). In an example embodiment, the now secondary replication agent 1656C may then write the received FSM record blocks to the now secondary ledger file 1664C at 1724.

At 1726, the now secondary matching engine 1642C issues a read command to read the FSM record blocks recorded in the now secondary ledger file 1664C. For example, the now secondary matching engine 1642C may be an application 402 operating in the application layer 400 of the third computing entity 200C. For example, the secondary matching engine 1642C may request and receive one or more FSM record blocks and/or a stream of FSM record blocks and process the one or more FSM record blocks or stream of FSM record blocks. For example, the secondary matching engine 1642C may update the now secondary order book 1644C based on the stream of FSM record blocks read from the secondary ledger file 1664C. For example, the secondary order book 1644C may include an indication of the state of the one or more orders. In an example embodiment, the order states indicated by the secondary order book 1644C may be similar to the order states indicated by the primary order book 1644B. For example, the order states indicated by the secondary order book 1644B are the same as the order states indicated by the primary order book 1644B other than a small processing delay due to processes 1718-1726.

As should be understood, example embodiments provide the advantage of providing an immediate failover. In particular, the secondary order book can take over as the primary order book without requiring the delay caused by a recovery process. For example, the secondary order book comprises real time or near real time up-to-date order statuses such that the secondary order book may take over as the primary order book in the case of a fault, restart, and/or the like of the first node computing entity in real time or near real time with respect to the receipt of the bad telemetry data by the failover controller. Thus, various embodiments provide an improvement to the technical field of automated order processing and management. In an example embodiment, an immediate failover means that the secondary order book takes over as the primary order book in real time or near real time with respect to the identification of the bad telemetry data, the receiving of the bad telemetry data by the failover controller, the issuing of the change to primary directive by the failover controller, and/or the receipt of the change to primary directive by the secondary node computing entity.

IV. Conclusion

As detailed above, example embodiments provide a user directory activity ledger 602 through a blockchain and/or distributed ledger. The user directory activity ledger 602 serves multiple purposes; firstly, as a distributed and immutable source of record of the creation and management of user accounts and permissions and/or data access grants (e.g., by creating user accounts and generating symmetric and asymmetric keys). Secondly, the user directory activity ledger 602 serves as the communication mechanism for activities between actors; i.e. by posting FSM record blocks to the distributed ledger, actors are "notified" that they have been given new keys. Thus, embodiments of the present invention provide for permissioning to access content of the distributed ledger to particular users through ledger itself. The distributed ledger further acts to provide a distributed and immutable source of application activity and/or events. For example, the distributed ledger may store event information/data corresponding to one or more orders. In example embodiment, a blockchain and/or distributed ledger is a type of database that takes a number of records and puts them in a block (rather like collating them on to a single sheet of paper). Each block is then 'chained' to the next block, using a cryptographic signature. This allows block chains to be used like a ledger, which can be shared and corroborated by anyone with the appropriate permissions.

In an example embodiment, the FSM record blocks of the distributed ledger provide activity event information/data and the states of one or more domain objects as a result of the event. Additionally, example embodiments provide a snapshot of the distributed ledger and the current states of one or more domain objects (e.g., at the time the snapshot is generated, created, and/or the like) that is stored to the distributed ledger. Example embodiments provide for management of user accounts and providing of access to information/data stored in the distributed ledger via the distributed ledger itself. Example embodiments further provide for the immediate failover of a primary order book to a secondary order book.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing user access to a set of data stored in a distributed ledger, the distributed ledger stored by a plurality of node computing entities, the method comprising:
   receiving, by a first node computing entity of the plurality of node computing entities and comprising at least one processor, a memory, and a communications interface configured to communicate via at least one network, a share key request indicating that a first user account has authorized a second user account to have access to a set of data stored in the distributed ledger, wherein (a) the set of data is encrypted and (b) a data access key is configured for use in decrypting the set of data;
   accessing, by the first node computing entity, (a) an encrypting key corresponding to the second user account and (b) a signing key corresponding to the first user account from a local wallet stored in the memory;
   encrypting, by the first node computing entity, the data access key for accessing the set of data using the encrypting key corresponding to the second user account;
   generating, by the first node computing entity, a block comprising a header and the encrypted data access key, wherein the header comprises at least one of (a) a list of records in the block or (b) a hash of the list of records in the block;
   signing, by the first node computing entity, the block comprising the encrypted data access key using the signing key corresponding to the first user account; and
   posting, by the first node computing entity, the signed block comprising the encrypted data access key to the distributed ledger.

2. The method of claim 1, wherein upon receipt of the signed block comprising the encrypted data access key, a second node computing entity authenticates the signed block using an authentication key corresponding to the first user.

3. The method of claim 2, wherein upon authenticating the signed block, the second node computing entity decrypts the encrypted data access key using a decrypting key corresponding to the second user.

4. The method of claim 3, wherein upon decrypting the encrypted data access key, the data access key is stored to a wallet in a local file storage stored in a memory of the second computing entity.

5. The method of claim 1, wherein the data access key provides retroactive permission for the second user account to access data encrypted with the data access key and stored in the distributed ledger.

6. The method of claim 1, wherein the distributed ledger comprises one or more add/edit user messages creating or editing one or more user accounts.

7. The method of claim 1, wherein the signing key (a) is a private digital signature key and (b) corresponds to an authentication key, the authentication key being a public digital signature key.

8. The method of claim 1, wherein the encryption key (a) is a public Diffie-Hellman-Merkle key and (b) corresponds to a decryption key, the decryption key being a private Diffie-Hellman key.

9. The method of claim 1, wherein the posting of the signed block comprising the encrypted data access key is configured to cause a second node computing entity of the plurality of node computing entities to verify the encrypted data access key based on an authorizer key corresponding to the first user account stored in a second local wallet stored by a second memory of the second node computing entity, decrypt the data access key using a decrypting key stored in association with the second user account in the second memory, and store the data access key in the second local wallet.

10. The method of claim 1, wherein posting the block to the distributed ledger comprises a validation process configured to ensure that a state of a domain object associated with the block transitions in a sequence permitted by the distributed ledger.

11. An apparatus for providing user access to a set of data stored in a distributed ledger, the distributed ledger stored by a plurality of node computing entities, the apparatus being one of the plurality of node computing entities, the apparatus comprising at least one processor, a communications interface configured for communicating via at least one network, and at least one memory storing computer program code, the at least one memory and the computer program code configured to, with the processor, cause the apparatus to at least:
   receive a share key request indicating that a first user account has authorized a second user account to have access to a set of data stored in the distributed ledger, wherein (a) the set of data is encrypted and (b) a data access key is configured for use in decrypting the set of data;
   access (a) an encrypting key corresponding to the second user account and (b) a signing key corresponding to the first user account from a local wallet stored in the at least one memory;
   encrypt a data access key for accessing the set of data using the encrypting key corresponding to the second user account;
   generate a block comprising a header and the encrypted data access key, wherein the header comprises at least one of (a) a list of records in the block or (b) a hash of the list of records in the block;

sign the block comprising the encrypted data access key using the signing key corresponding to the first user account; and post the signed block comprising the encrypted data access key to the distributed ledger.

12. The apparatus of claim 11, wherein upon receipt of the signed block comprising the encrypted data access key, a second node computing entity authenticates the signed block using an authentication key corresponding to the first user.

13. The apparatus of claim 12, wherein upon authenticating the signed block, the second node computing entity decrypts the encrypted data access key using a decrypting key corresponding to the second user.

14. The apparatus of claim 13, wherein upon decrypting the encrypted data access key, the data access key is stored to a wallet in a local file storage stored in a memory of the second computing entity.

15. The apparatus of claim 11, wherein the data access key provides retroactive permission for the second user account to access data encrypted with the data access key and stored in the distributed ledger.

16. The apparatus of claim 11, wherein the distributed ledger comprises one or more add/edit user messages creating or editing one or more user accounts.

17. The apparatus of claim 11, wherein the signing key (a) is a private digital signature key and (b) corresponds to an authentication key, the authentication key being a public digital signature key.

18. The apparatus of claim 11, wherein the encryption key (a) is a public Diffie-Hellman-Merkle key and (b) corresponds to a decryption key, the decryption key being a private Diffie-Hellman key.

19. A computer program product for providing user access to a set of data stored in a distributed ledger the distributed ledger stored by a plurality of node computing entities, the computer program product comprising at least one non-transitory computer-readable storage medium having computer-executable program code instructions stored therein, the computer-executable program code instructions comprising program code instructions configured to, when executed by a processor of a node computing entity of the plurality of node computing entities:

receive a share key request indicating that a first user account has authorized a second user account to have access to a set of data stored in the distributed ledger, wherein (a) the set of data is encrypted and (b) a data access key is configured for use in decrypting the set of data;

access (a) an encrypting key corresponding to the second user account and (b) a signing key corresponding to the first user account from a local wallet stored in a memory of the node computing entity;

encrypt a data access key for accessing the set of data using the encrypting key corresponding to the second user account;

generate a block comprising a header and the encrypted data access key, wherein the header comprises at least one of (a) a list of records in the block or (b) a hash of the list of records in the block;

sign the block comprising the encrypted data access key using the signing key corresponding to the first user account; and post the signed block comprising the encrypted data access key to the distributed ledger.

20. The computer program product of claim 19, wherein:
the signing key (a) is a private digital signature key and (b) corresponds to an authentication key, the authentication key being a public digital signature key, and the encryption key (a) is a public Diffie-Hellman-Merkle key and (b) corresponds to a decryption key, the decryption key being a private Diffie-Hellman key.

\* \* \* \* \*